United States Patent
Muthler et al.

(10) Patent No.: US 11,450,057 B2
(45) Date of Patent: Sep. 20, 2022

(54) HARDWARE ACCELERATION FOR RAY TRACING PRIMITIVES THAT SHARE VERTICES

(71) Applicant: NVIDIA Corporation, Santa Clara, CA (US)

(72) Inventors: Gregory Muthler, Austin, TX (US); John Burgess, Austin, TX (US); Ian Chi Yan Kwong, City San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 164 days.

(21) Appl. No.: 16/901,023

(22) Filed: Jun. 15, 2020

(65) Prior Publication Data
US 2021/0390759 A1    Dec. 16, 2021

(51) Int. Cl.
| | |
|---|---|
| *G06T 15/06* | (2011.01) |
| *G06T 15/08* | (2011.01) |
| *G06F 9/50* | (2006.01) |
| *G06T 17/20* | (2006.01) |
| *G06T 17/10* | (2006.01) |

(52) U.S. Cl.
CPC .......... *G06T 15/06* (2013.01); *G06F 9/5027* (2013.01); *G06T 15/08* (2013.01); *G06T 17/10* (2013.01); *G06T 17/205* (2013.01)

(58) Field of Classification Search
CPC ......... G06T 15/06; G06T 15/08; G06T 17/10; G06T 17/205; G06T 2219/008
See application file for complete search history.

(56) References Cited

U.S. PATENT DOCUMENTS

| | | |
|---|---|---|
| 6,285,376 B1 | 9/2001 | Choi |
| 6,489,955 B1 | 12/2002 | Newhall, Jr. |
| 8,059,122 B1 | 11/2011 | MacGillivray |
| 9,552,664 B2 | 1/2017 | Laine et al. |
| 9,569,559 B2 | 2/2017 | Karras et al. |
| 9,582,607 B2 | 2/2017 | Laine et al. |
| 9,607,426 B1 | 3/2017 | Peterson |

(Continued)

OTHER PUBLICATIONS

Liu, A new point containment test algorithm based on preprocessing and determining triangles, 2010, Computer-Aided Design, pp. 1143-1150 (Year: 2010).*

(Continued)

*Primary Examiner* — Phuc N Doan
(74) *Attorney, Agent, or Firm* — Nixon & Vanderhye, P.C.

(57) ABSTRACT

Enhanced techniques applicable to a ray tracing hardware accelerator for traversing a hierarchical acceleration structure and its underlying primitives are disclosed. For example, traversal speed is improved by grouping processing of primitives sharing at least one feature (e.g., a vertex or an edge) during ray-primitive intersection testing. Grouping the primitives for ray intersection testing can reduce processing (e.g., projections and transformations of primitive vertices and/or determining edge function values) because at least a portion of the processing results related to the shared feature in one primitive can be used in determine whether the ray intersects another primitive(s). Processing triangles sharing an edge can double the culling rate of the triangles in the ray/triangle intersection test without replicating the hardware.

25 Claims, 20 Drawing Sheets

(56) References Cited

U.S. PATENT DOCUMENTS

| | | | |
|---|---|---|---|
| 10,025,879 | B2 | 7/2018 | Karras et al. |
| 10,235,338 | B2 | 3/2019 | Laine et al. |
| 2008/0079715 | A1 | 4/2008 | Shearer |
| 2009/0167763 | A1 | 7/2009 | Waechter |
| 2011/0181606 | A1* | 7/2011 | Sumner .................. G06T 13/00 345/474 |
| 2011/0267347 | A1* | 11/2011 | Purcell .................. G06T 15/06 345/426 |
| 2011/0316855 | A1 | 12/2011 | Mejdrich |
| 2012/0075287 | A1* | 3/2012 | Park ....................... G06T 15/06 345/419 |
| 2016/0070767 | A1 | 3/2016 | Karras et al. |
| 2016/0070820 | A1 | 3/2016 | Laine et al. |
| 2016/0071234 | A1 | 3/2016 | Lehtinen et al. |
| 2017/0091898 | A1 | 3/2017 | Hwang |
| 2018/0286103 | A1* | 10/2018 | Woop ..................... G06T 15/06 |
| 2019/0019326 | A1 | 1/2019 | Clark et al. |
| 2019/0156550 | A1* | 5/2019 | Stanard ................ G06T 15/506 |
| 2020/0051314 | A1* | 2/2020 | Laine ..................... G06T 15/06 |
| 2020/0193683 | A1* | 6/2020 | Saleh .................... G06T 15/005 |
| 2020/0193684 | A1* | 6/2020 | Saleh .................... G06T 15/06 |
| 2020/0193685 | A1* | 6/2020 | Saleh .................... G06T 15/80 |
| 2020/0302677 | A1* | 9/2020 | Saleh .................... G06T 15/06 |
| 2021/0012552 | A1* | 1/2021 | Laine .................... G06T 15/005 |

OTHER PUBLICATIONS

U.S. Appl. No. 14/563,872, filed Dec. 8, 2014.
U.S. Appl. No. 14/697,480, filed Apr. 27, 2015.
U.S. Appl. No. 14/737,343, filed Jun. 11, 2015.
U.S. Appl. No. 16/101,066, filed Aug. 10, 2018.
U.S. Appl. No. 16/101,109, filed Aug. 10, 2018.
U.S. Appl. No. 16/101,180, filed Aug. 10, 2018.
U.S. Appl. No. 16/101,196, filed Aug. 10, 2018.
U.S. Appl. No. 16/101,232, filed Aug. 10, 2018.
U.S. Appl. No. 16/101,247, filed Aug. 10, 2018.
EEE 754-2008 Standard for Floating-Point Arithmetic, Aug. 29, 2008, 70 pages.
The Cg Tutorial, Chapter 7, "Environment Mapping Techniques," NVIDIA Corporation, 2003, 32 pages.
Akenine-Möller, Tomas, et al., "Real-Time Rendering," Section 9.8.2, Third Edition CRC Press, 2008, p. 412.
Appel, Arthur, "Some techniques for shading machine renderings of solids," AFIPS Conference Proceedings: 1968 Spring Joint Computer Conference, 9 pages.
Foley, James D., et al., "Computer Graphics: Principles and Practice," $2^{nd}$ Edition Addison-Wesley 1996 and $3^{rd}$ Edition Addison-Wesley 2014.
Glassner, Andrew, "An Introduction to ray Tracing," Morgan Kaufmann, 1989.
Hall, Daniel, "Advanced Rendering Technology," Graphics Hardware 2001, 7 pages.
Hery, Christophe, et al., "Towards Bidirectional Path Tracing at Pixar," 2016, 20 pages.
Kajiya, James T., "The Rendering Equation," SIGGRAPH, vol. 20, No. 4, 1986, pp. 143-150.
Parker, Steven G., et al., "OptiX: A General Purpose Ray Tracing Engine," ACM Transactions on Graphics, vol. 29, Issue 4, Article No. 66, Jul. 2010, 13 pages.
Quinnell, Eric Charles, "Floating-Point Fused Multiple-Add Architectures," Dissertation, University of Texas at Austin, 2007, 163 pages.
Stich, Martin, "Introduction to NVIDIA RTX and DirectX Ray Tracing," NVIDIA Developer Blog, Mar. 19, 2018, 13 pages.
Whitted, Turner, "An Improved Illumination Model for Shaded Display," Communications of the ACM, vol. 23, No. 6, Jun. 1990, pp. 343-349.
Woop, Sven, "A Ray Tracing Hardware Architecture for Dynamic Scenes," Thesis, Universitat des Saarlandes, 2004, 100 pages.
Woop, Sven, et al., "RPU: A Programmable Ray Processing Unit for Realtime Ray Tracing," ACM Transactions on Graphics, Jul. 2005, 11 pages.
Woop, Sven, et al., "Watertight Ray/Triangle Intersection," Journal of Computer Graphics Techniques, vol. 2, No. 1, 2013, pp. 65-82.
Office Action dated Jul. 11, 2019, issued in U.S. Appl. No. 16/101,066.
U.S. Appl. No. 16/101,148, filed Aug. 10, 2018.
Manolopoulos, Konstantinos, D. Reisis, and Vassilios A. Chouliaras. "An efficient multiple precision floating-point Multiply-Add Fused unit." Microelectronics Journal 49 (2016): 10-18.
Chen, Min and T. Townsend. "Efficient and Consistent Algorithms for Determining the Containment of Points in Polygons and Polyhedra." (1987). (Year: 1987).
Azad, Amir Baniasad, and Amir Sabbagh Mollahoseini. "Design and Implementation of a New Multi-Functional Fused Dog Product in FPGA." (2014). (Year: 2014).
U.S. Appl. No. 16/901,847, filed Jun. 15, 2020.
Lefrancois et al., NVIDIA Vulkan Ray Tracing Tutorial, Dec. 2019, https://developer.nvidia.com/rtx/raytracing/vkray.

* cited by examiner

Example Ray Tracing Shading Pipeline

FIG. 7 TRAVERSAL COPROCESSOR

TTU Processing

FIG. 16

T2 unique => R0 = T0; R1 = T1; R2 = T2;
T1 unique => R0 = T2; R1 = T0; R2 = T1;
T0 unique => R0 = T1; R1 = T2; R2 = T0;

FIG. 17

```
P0  P1  P2  =>  R0  R1  R3
--  --  --      --  --  --
R0  R1  Px  =>  R0  R1  Px
R1  R0  Px  =>  R1  R0  Px  =FLIP=>  R0  R1  Px
R0  Px  R1  =>  R1  R0  Px  =FLIP=>  R0  R1  Px
R1  Px  R0  =>  R0  R1  Px
Px  R0  R1  =>  R0  R1  Px
Px  R1  R0  =>  R1  R0  Px  =FLIP=>  R0  R1  Px
```

Example Process To Generate an Image

HARDWARE ACCELERATION FOR RAY TRACING PRIMITIVES THAT SHARE VERTICES

CROSS-REFERENCE TO RELATED PATENTS AND APPLICATIONS

This application is related to the following commonly-assigned US patents and patent applications, the entire contents of each of which are incorporated by reference:

U.S. application Ser. No. 14/563,872 titled "Short Stack Traversal of Tree Data Structures" filed Dec. 8, 2014;

U.S. Pat. No. 9,582,607 titled "Block-Based Bounding Volume Hierarchy";

U.S. Pat. No. 9,552,664 titled "Relative Encoding For A Block-Based Bounding Volume Hierarchy";

U.S. Pat. No. 9,569,559 titled "Beam Tracing";

U.S. Pat. No. 10,025,879 titled "Tree Data Structures Based on a Plurality of Local Coordinate Systems";

U.S. application Ser. No. 14/737,343 titled "Block-Based Lossless Compression of Geometric Data" filed Jun. 11, 2015;

U.S. patent application Ser. No. 16/101,066 titled Method for Continued Bounding Volume Hierarchy Traversal on Intersection Without Shader Intervention;

U.S. patent application Ser. No. 16/101,109 titled "Method for Efficient Grouping of Cache Requests for Datapath Scheduling";

U.S. patent application Ser. No. 16/101,247 titled "A Robust, Efficient Multiprocessor-Coprocessor Interface";

U.S. patent application Ser. No. 16/101,180 titled "Query-Specific Behavioral Modification of Tree Traversal";

U.S. patent application Ser. No. 16/101,148 titled "Conservative Watertight Ray Triangle Intersection";

U.S. patent application Ser. No. 16/101,196 titled "Method for Handling Out-of-Order Opaque and Alpha Ray/Primitive Intersections";

U.S. patent application Ser. No. 16/101,232 titled "Method for Forward Progress and Programmable Timeouts of Tree Traversal Mechanisms in Hardware"; and U.S. patent application Ser. No. 16/901,847 titled "Ray Tracing Hardware Acceleration for Supporting Motion Blur and Moving/Deforming Geometry".

FIELD

The present technology relates to computer graphics, and more particularly to ray tracers. More particularly, the technology relates to hardware acceleration of computer graphics processing including but not limited to ray tracing. The example non-limiting technology herein also relates to a hardware-based ray/primitive intersection testing that efficiently determines ray-primitive intersections e.g., for real time ray tracing. Still more particularly, the example non-limiting technology herein relates to determining intersections between a ray and plural primitives sharing at least one feature (e.g., a vertex or an edge). In still more detail, the example non-limiting technology herein relates to an improved hardware-based ray-primitive test block that determines intersections for triangles sharing an edge.

BACKGROUND

Real time computer graphics have advanced tremendously over the last 30 years. With the development in the 1980's of powerful graphics processing units (GPUs) providing 3D hardware graphics pipelines, it became possible to produce 3D graphical displays based on texture-mapped polygon primitives in real time response to user input. Such real time graphics processors were built upon a technology called scan conversion rasterization, which is a means of determining visibility from a single point or perspective. Using this approach, three-dimensional objects are modelled from surfaces constructed of geometric primitives, typically polygons such as triangles. The scan conversion process establishes and projects primitive polygon vertices onto a view plane and fills in the points inside the edges of the primitives. See e.g., Foley, Van Dam, Hughes et al, Computer Graphics: Principles and Practice (2d Ed. Addison-Wesley 1995 & 3d Ed. Addison-Wesley 2014).

Hardware has long been used to determine how each polygon surface should be shaded and texture-mapped and to rasterize the shaded, texture-mapped polygon surfaces for display. Typical three-dimensional scenes are often constructed from millions of polygons. Fast modern GPU hardware can efficiently process many millions of graphics primitives for each display frame (every $\frac{1}{30}^{th}$ or $\frac{1}{60}^{th}$ of a second) in real time response to user input. The resulting graphical displays have been used in a variety of real time graphical user interfaces including but not limited to augmented reality, virtual reality, video games and medical imaging. But traditionally, such interactive graphics hardware has not been able to accurately model and portray reflections and shadows.

There is another graphics technology which does perform physically realistic visibility determinations for reflection and shadowing. It is called "ray tracing". Ray tracing refers to casting a ray into a scene and determining whether and where that ray intersects the scene's geometry. This basic ray tracing visibility test is the fundamental primitive underlying a variety of rendering algorithms and techniques in computer graphics. Ray tracing was developed at the end of the 1960's and was improved upon in the 1980's. See e.g., Appel, "Some Techniques for Shading Machine Renderings of Solids" (SJCC 1968) pp. 27-45; Whitted, "An Improved Illumination Model for Shaded Display" Pages 343-349 Communications of the ACM Volume 23 Issue 6 (June 1980); and Kajiya, "The Rendering Equation", Computer Graphics (SIGGRAPH 1986 Proceedings, Vol. 20, pp. 143-150). Since then, ray tracing has been used in non-real time graphics applications such as design and film making. Anyone who has seen "Finding Dory" (2016) or other Pixar animated films has seen the result of the ray tracing approach to computer graphics—namely realistic shadows and reflections. See e.g., Hery et al, "Towards Bidirectional Path Tracing at Pixar" (2016).

Generally, ray tracing is a rendering method in which rays are used to determine the visibility of various elements in the scene. Ray tracing is a primitive used in a variety of rendering algorithms including for example path tracing and Metropolis light transport. In an example algorithm, ray tracing simulates the physics of light by modeling light transport through the scene to compute all global effects (including for example reflections from shiny surfaces) using ray optics. In such uses of ray tracing, an attempt may be made to trace each of many hundreds or thousands of light rays as they travel through the three-dimensional scene from potentially multiple light sources to the viewpoint. Often, such rays are traced relative to the eye through the scene and tested against a database of all geometry in the scene. The rays can be traced forward from lights to the eye, or backwards from the eye to the lights, or they can be traced to see if paths starting from the virtual camera and starting at the eye have a clear line of sight. The testing determines either the nearest intersection (in order to determine what is visible from the eye) or traces rays from the surface of an object toward a light source to determine if there is anything intervening that would block the transmission of light to that point in space. Because the rays are similar to the rays of light in reality, they make available a number of realistic effects that are not possible using the raster based real time 3D graphics technology that has been implemented over the last thirty years. Because each illuminating ray from each light source within the scene is evaluated as it passes through each object in the scene, the resulting images can appear as if they were photographed in reality. Accordingly, these ray tracing methods have long been used in professional graphics applications such as design and film, where they have come to dominate over raster-based rendering.

Ray tracing can be used to determine if anything is visible along a ray (for example, testing for occluders between a shaded point on a geometric primitive and a point on a light source) and can also be used to evaluate reflections (which may for example involve performing a traversal to determine the nearest visible surface along a line of sight so that software running on a streaming processor can evaluate a material shading function corresponding to what was hit— which in turn can launch one or more additional rays into the scene according to the material properties of the object that was intersected) to determine the light returning along the ray back toward the eye. In classical Whitted-style ray tracing, rays are shot from the viewpoint through the pixel grid into the scene, but other path traversals are possible. Typically, for each ray, the closest object is found. This intersection point can then be determined to be illuminated or in shadow by shooting a ray from it to each light source in the scene and finding if any objects are in between. Opaque objects block the light, whereas transparent objects attenuate it. Other rays can be spawned from an intersection point. For example, if the intersecting surface is shiny or specular, rays are generated in the reflection direction. The ray may accept the color of the first object intersected, which in turn has its intersection point tested for shadows. This reflection process is recursively repeated until a recursion limit is reached or the potential contribution of subsequent bounces falls below a threshold. Rays can also be generated in the direction of refraction for transparent solid objects, and again recursively evaluated. Ray tracing technology thus allows a graphics system to develop physically correct reflections and shadows that are not subject to the limitations and artifacts of scan conversion techniques.

Ray tracing has been used together with or as an alternative to rasterization and z-buffering for sampling scene geometry. It can also be used as an alternative to (or in combination with) environment mapping and shadow texturing for producing more realistic reflection, refraction and shadowing effects than can be achieved via texturing techniques or other raster "hacks". Ray tracing may also be used as the basic primitive to accurately simulate light transport in physically-based rendering algorithms such as path tracing, photon mapping, Metropolis light transport, and other light transport algorithms.

The main challenge with ray tracing has generally been speed. Ray tracing requires the graphics system to compute and analyze, for each frame, each of many millions of light rays impinging on (and potentially reflected by) each surface making up the scene. In the past, this enormous amount of computation complexity was impossible to perform in real time.

One reason modern GPU 3D graphics pipelines are so fast at rendering shaded, texture-mapped surfaces is that they use coherence efficiently. In conventional scan conversion, everything is assumed to be viewed through a common window in a common image plane and projected down to a single vantage point. Each triangle or other primitive is sent through the graphics pipeline and covers some number of pixels. All related computations can be shared for all pixels rendered from that triangle. Rectangular tiles of pixels corresponding to coherent lines of sight passing through the window may thus correspond to groups of threads running in lock-step in the same streaming processor. All the pixels falling between the edges of the triangle are assumed to be the same material running the same shader and fetching adjacent groups of texels from the same textures. In ray tracing, in contrast, rays may start or end at a common point (a light source, or a virtual camera lens) but as they propagate through the scene and interact with different materials, they quickly diverge. For example, each ray performs a search to find the closest object. Some caching and sharing of results can be performed, but because each ray potentially can hit different objects, the kind of coherence that GPU's have traditionally taken advantage of in connection with texture mapped, shaded triangles is not present (e.g., a common vantage point, window and image plane are not there for ray tracing). This makes ray tracing much more computationally challenging than other graphics approaches—and therefore much more difficult to perform on an interactive basis.

In 2010, NVIDIA took advantage of the high degree of parallelism of NVIDIA GPUs and other highly parallel architectures to develop the OptiX™ ray tracing engine. See Parker et al., "OptiX: A General Purpose Ray Tracing Engine" (ACM Transactions on Graphics, Vol. 29, No. 4, Article 66, July 2010). In addition to improvements in API's (application programming interfaces), one of the advances provided by OptiX™ was improving the acceleration data structures used for finding an intersection between a ray and the scene geometry. Such acceleration data structures are usually spatial or object hierarchies used by the ray tracing traversal algorithm to efficiently search for primitives that potentially intersect a given ray. OptiX™ provides a number of different acceleration structure types that the application can choose from. Each acceleration structure in the node graph can be a different type, allowing combinations of high-quality static structures with dynamically updated ones.

The OptiX™ programmable ray tracing pipeline provided significant advances, but was still generally unable by itself to provide real time interactive response to user input on relatively inexpensive computing platforms for complex 3D scenes. Since then, NVIDIA has been developing hardware acceleration capabilities for ray tracing. See e.g., U.S. Pat. Nos. 9,582,607; 9,569,559; US20160070820; US20160070767; and the other US patents and patent applications cited above.

A basic task for most ray tracers is to test a ray against all primitives (commonly triangles in one embodiment) in the scene and report either the closest hit (according to distance measured along the ray) or simply the first (not necessarily closest) hit encountered, depending upon use case. The naïve algorithm would be an O(n) brute-force search. However, due to the large number of primitives in a 3D scene of arbitrary complexity, it usually is not efficient or feasible for a ray tracer to test every geometric primitive in the scene for an intersection with a given ray.

By pre-processing the scene geometry and building a suitable acceleration data structure in advance, however, it is possible to reduce the average-case complexity to O(log n). Acceleration data structures, such as a bounding volume hierarchy or BVH, allow for quick determination as to which bounding volumes can be ignored, which bounding volumes may contain intersected geometric primitives, and which intersected geometric primitives matter for visualization and which do not. Using simple volumes such as boxes to contain more complex objects provides computational and memory efficiencies that help enable ray tracing to proceed in real time.

FIGS. 1A-1C illustrate ray tracing intersection testing in the context of a bounding volume including geometric mesh 20. FIG. 1A shows a ray 102 in a virtual space including bounding volumes 10 and 15. To determine whether the ray 102 intersects geometry in the mesh 20, each geometric primitive (e.g., triangle) could be directly tested against the ray 102. But to accelerate the process (since the object could contain many thousands of geometric primitives), the ray 102 is first tested against the bounding volumes 10 and 15. If the ray 102 does not intersect a bounding volume, then it does not intersect any geometry inside of the bounding volume and all geometry inside the bounding volume can be ignored for purposes of that ray. Because in FIG. 1A the ray 102 misses bounding volume 10, any geometry of mesh 20 within that bounding volume need not be tested for intersection. While bounding volume 15 is intersected by the ray 102, bounding volume 15 does not contain any geometry and so no further testing is required.

On the other hand, if a ray such as ray 104 shown in FIG. 1B intersects a bounding volume 10 that contains geometry, then the ray may or may not intersect the geometry inside of the bounding volume so further tests need to be performed on the geometry itself to find possible intersections. Because the rays 104, 106 in FIGS. 1B and 1C intersect a bounding volume 10 that contains geometry, further tests need to be performed to determine whether any (and which) of the primitives inside of the bounding volume are intersected. In FIG. 1B, further testing of the intersections with the primitives would indicate that even though the ray 104 passes through the bounding volume 10, it does not intersect any of the geometry the bounding volume encloses (alternatively, as mentioned above, bounding volume 10 could be further volumetrically subdivided so that a bounding volume intersection test could be used to reveal that the ray does not intersect any geometry or more specifically which geometric primitives the ray may intersect).

FIG. 1C shows a situation in which the ray intersects bounding volume 10 and contains geometry that ray 306 intersects. To perform real time ray tracing, an intersection tester tests each geometric primitive within the intersected bounding volume 10 to determine whether the ray intersects that geometric primitive.

The acceleration data structure most commonly used by modern ray tracers is a bounding volume hierarchy (BVH) comprising nested axis-aligned bounding boxes (AABBs). The leaf nodes of the BVH contain the primitives (e.g., triangles) to be tested for intersection. The BVH is most often represented by a graph or tree structure data representation. In ray tracing, the time for finding the closest (or for shadows, any) intersection for a ray is typically order O(log n) for n objects when such an acceleration data structure is used. For example, AABB bounding volume hierarchies (BVHs) of the type commonly used for modern ray tracing acceleration data structures typically have an O(log n) search behavior.

The BVH acceleration data structure represents and/or references the 3D model of an object or a scene in a manner that will help assist in quickly deciding which portion of the object a particular ray is likely to intersect and quickly rejecting large portions of the scene the ray will not intersect. The BVH data structure represents a scene or object with a bounding volume and subdivides the bounding volume into smaller and smaller bounding volumes terminating in leaf nodes containing geometric primitives. The bounding volumes are hierarchical, meaning that the topmost level encloses the level below it, that level encloses the next level below it, and so on. In one embodiment, leaf nodes can potentially overlap other leaf nodes in the bounding volume hierarchy.

NVIDIA's RTX platform includes a ray tracing technology that brings real-time, cinematic-quality rendering to content creators and game developers. See https://developer.nvidia.com/rtx/raytracing. In many or most implementations including NVIDIA RT Cores, the bounding volumes such as shown in FIG. 1A-1C use axis-aligned bounding boxes ("AABBs"), which can be compactly stored and easily tested for ray intersection. If a ray intersects against the bounding box of the geometry, then the underlying geometry is then tested as well. If a ray does not intersect against the bounding box of the geometry though, then that underlying geometry does not need to be tested. As FIGS. 1A-1C show, a hierarchy of AABB's is created to increase the culling effect of a single AABB bounding box test. This allows for efficient traversal and a quick reduction to the geometry of interest.

Given the great potential of improving real time ray tracing graphics processing systems for rendering high quality images by increasing processing speed or being able to increase scene complexity by using a larger number of primitives, further work is possible and desirable. In particular, it would be highly desirable to accelerate testing for intersections between a ray and geometric primitives of a scene or object.

BRIEF DESCRIPTION OF THE DRAWINGS

FIG. 16 shows pseudo-math describing the mapping between vertices R0, R1 and R2, and vertices T0, T1 and T2.

FIG. 17 shows pseudo-math describing the mapping between vertices R0, R1 and R3, and vertices T0, T1 and T2.

DETAILED DESCRIPTION OF NON-LIMITING EMBODIMENTS

Figure 1A:
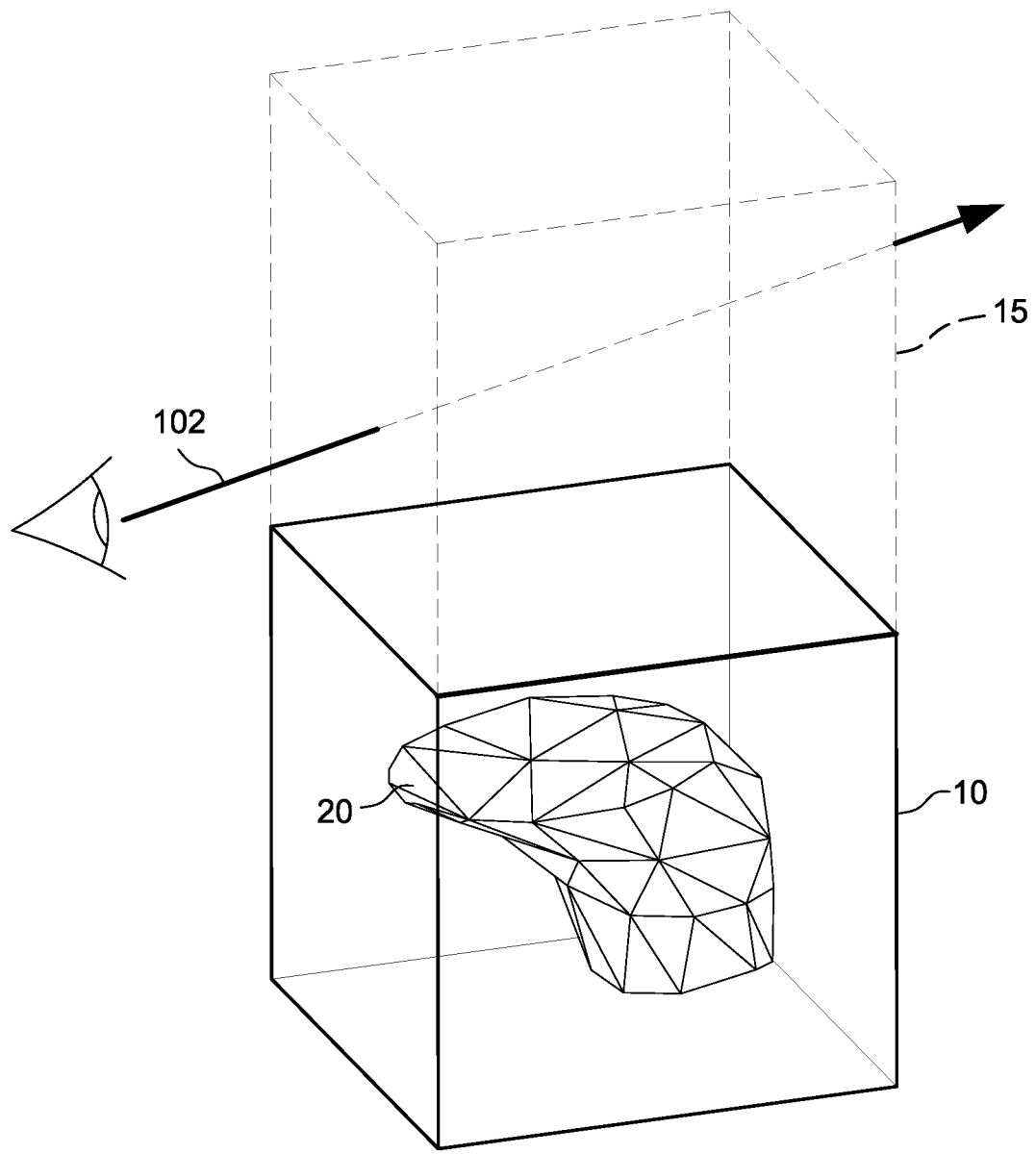
FIGS. 1A-1C show example simplified ray tracing tests to determine whether the ray passes through a bounding volume containing geometry and whether the ray intersects geometry within the bounding volume.

Although BVH acceleration data structures allow large portions of the scene the ray will not intersect to be quickly rejected, the ray tracing system still needs to test each geometric primitive identified in intersected bounding volume leaf nodes for intersection with the ray. Depending on the complexity of the scene and/or object, the number of geometric primitives that need to be tested can be large. To increase the speed at which the geometric primitives are tested for intersections, the hardware could be duplicated to test multiple geometric primitives in parallel. While replicating the hardware may reduce the time needed to process the geometric primitives, it comes at semiconductor area and power cost.

The example non-limiting technology increases the number of geometric primitives that can be processed, without a proportional increase in hardware complexity. This is achieved by sharing processing results of testing plural geometric primitives that have at least one vertex in common. Because the at least one vertex is shared by the plurality of geometric primitives, processing results (e.g., projections and/or transformations) related to the at least one shared vertex can be shared for multiple geometric primitives with at least one vertex in common and do not need to be repeated or duplicated for each primitive. To process additional primitives in parallel, the non-limiting technology uses parallel ray/primitive testing hardware that shares results/calculations such that each component of the ray/primitive testing hardware does not need to be replicated and the overall complexity of the parallel hardware is reduced as compared to "brute force" approaches in which all hardware components are replicated.

The technology herein thus provides hardware-based capabilities that efficiently accelerate testing primitives for intersections with a ray. In one embodiment, multiple primitives sharing at least one vertex are grouped for ray intersection testing to accelerate the intersection testing. Grouping the primitives for ray intersection testing can reduce the processing (e.g., projections and/or transformations of primitive vertices) because at least a portion of the processing results related to one primitive can be used to test additional primitives.

In one example non-limiting embodiment, hardware configured to test primitives for intersection with a ray is expanded to handle intersection testing of one or more additional primitives sharing at least one vertex. The hardware is expanded with minimal hardware, to use at least a portion of the processing results from hardware testing of one primitive for the intersection with a ray to also assist in determining intersection of the ray with another, adjacent primitive. In the case of expanding the hardware to handle a pair of primitives (e.g., triangles) sharing a common edge, the ray-triangle testing hardware increases performance of triangle culling for a ray traced applications by leveraging calculations for common vertices across multiple triangles using minimal hardware. Examples of the present technology can intelligently increase (e.g., double) the rate at which triangle intersection misses are culled. Previous solutions performed the same work at a lower rate of throughput or required doubling/replication of the hardware. Overall example embodiments provide better performance per unit area.

The example non-limiting technology is able to increase the number of geometric primitives that can be processed per unit time or in parallel, without a proportional increase in hardware.

Building a Bounding Volume Hierarchy for More Efficient Intersection Testing

As explained above, ray-object intersection testing is made more efficient through use of an acceleration data structure. As described above, an acceleration data structure comprises a hierarchy of bounding volumes (bounding volume hierarchy or BVH) that recursively encapsulates smaller and smaller bounding volume subdivisions. The largest volumetric bounding volume may be termed a "root node." The smallest subdivisions of such hierarchy of bounding volumes ("leaf nodes") contain items. The items could be primitives (e.g., polygons such as triangles) that define surfaces of the object. Or, an item could be a sphere that contains a whole new level of the world that exists as an item because it has not been added to the BVH (think of the collar charm on the cat from "Men in Black" which contained an entire miniature galaxy inside of it). If the item comprises primitives, the traversal co-processor upon reaching an intersecting leaf node tests rays against the primitives associated with the leaf node to determine which object surfaces the rays intersect and which object surfaces are visible along the ray.

Building a BVH can occur in two parts: static and dynamic. In many applications, a complex scene is preprocessed and the BVH is created based on static geometry of the scene. Then, using interactive graphics generation including dynamically created and manipulated moving objects, another part of the BVH (or an additional, linked BVH(es) can be built in real time (e.g., in each frame) by driver or other software running on the real time interactive graphics system. BVH construction need not be hardware accelerated (although it may be in some non-limiting embodiments) but may implemented using highly-optimized software routines running on SMs 132 and/or CPU 120 and/or other development systems e.g., during development of an application.

Figure 2:
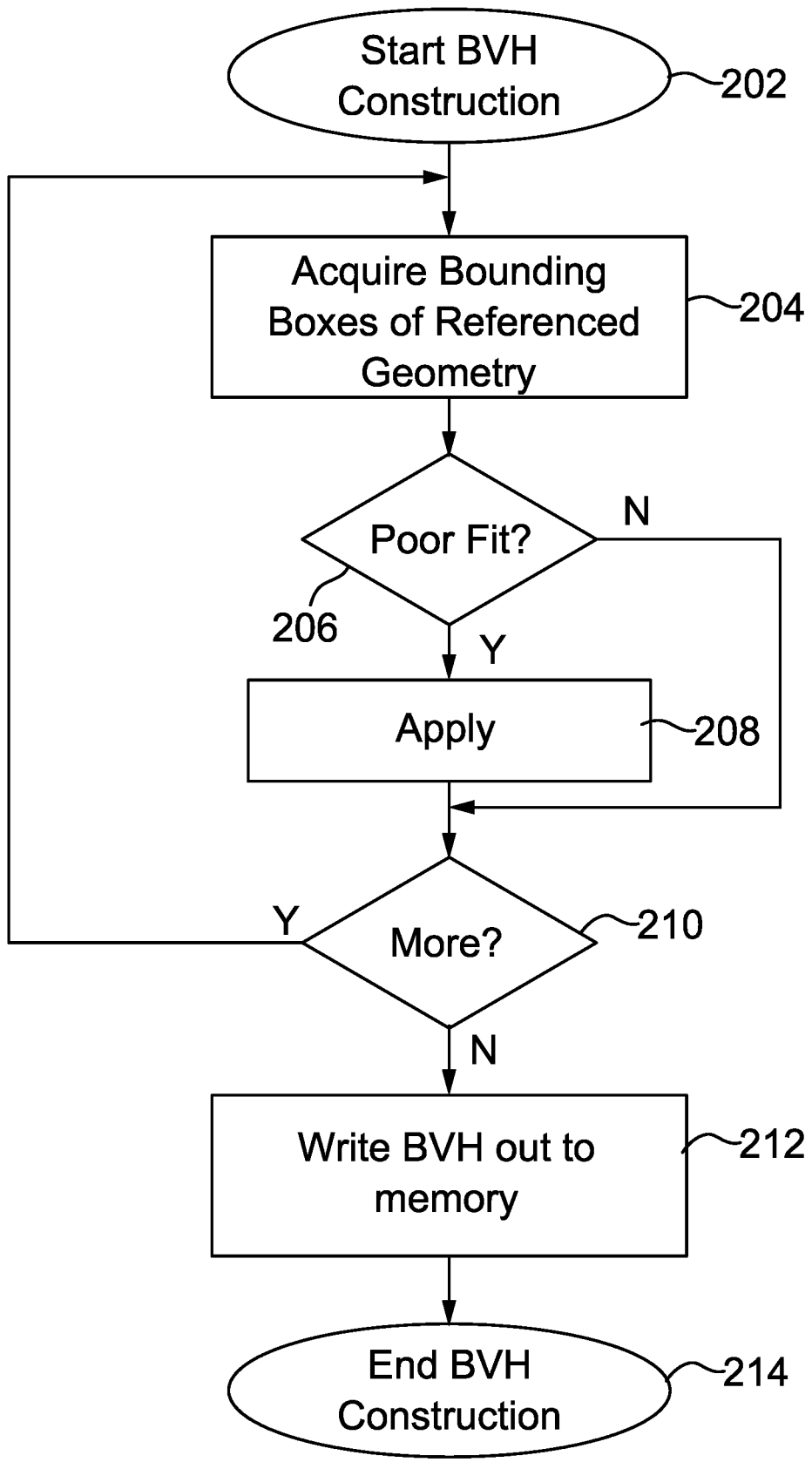
FIG. 2 shows an example process for constructing a suitable bounding volume hierarchy.

The first stage in BVH acceleration structure construction acquires the bounding boxes of the referenced geometry (FIG. 2, 204). This is achieved by executing for each geometric primitive in an object a bounding box procedure that returns a conservative axis-aligned bounding box (AABB) for its input primitive. Aligning bounding boxes with the axes of the relevant coordinate systems for the geometry provides for increased efficiency of real time geometrical operations such as intersection testing and coordinate transforms as compared for example to oriented bounding boxes (OBB's), bounding spheres, or other approaches. However, those skilled in the art will understand that the example non-limiting approaches herein can also be applied to more expensive bounding constructs such as OBBs, bounding spheres and other bounding volume technology.

Already subdivided bounding volumes that do include at least one portion of the geometry in a scene can be still further recursively subdivided—like the emergence of each of a succession of littler and littler cats from the hats of Dr. Seuss's' The Cat In The Hat Comes Back (1958). The number and configurations of recursive subdivisions will depend on the complexity and configuration of the 3D object being modeled as well as other factors such as desired resolution, distance of the object from the viewpoint, etc. One example subdivision scheme is a so-called 8-ary subdivision or "octree" in which each volume is subdivided into eight smaller volumes of uniform size, but many other spatial hierarchies and subdivision schemes are known such as a binary tree, a four-ary tree, a k-d tree, a binary space partitioning (BSP) tree, and a bounding volume hierarchy (BVH) tree. See e.g., U.S. Pat. No. 9,582,607.

At some level of subdivision (which can be different levels for different parts of the BVH), the BVH construction process encounters geometry making up the encapsulated object being modeled. Using the analogy of a tree, the successive volumetric subdivisions are the trunk, branches, boughs and twigs, and the geometric is finally revealed at the very tips of the tree, namely the leaves. At this point, the BVH construction process for example non-limiting embodiments herein performs an optimization at this stage to spot, using heuristic or other analytical techniques (which might include artificial intelligence and/or neural networks in some embodiments), those leaf nodes that present poor fits with respect to the geometry they contain (FIG. 2, 206).

This process continues until all bounding volumes containing geometry have been sufficiently subdivided to provide a reasonable number of geometric primitives per bounding box (FIG. 2, 210). The real time ray tracer that uses the BVH will determine ray-primitive intersections by comparing the spatial xyz coordinates of the vertices of each primitive with the xyz coordinates of the ray to determine whether the ray and the surface the primitive defines occupy the same space. The ray-primitive intersection test can be computationally intensive because there may be many triangles to test. In many cases, it may be more efficient to further volumetrically subdivide and thereby limit the number of primitives in any "leaf node" to something like 16 or fewer.

The resulting compressed tree comprising compressed treelets is written out into a data structure in memory for later use by the graphics processing hardware/software during e.g., real time graphics processing that includes real time ray tracing (FIG. 2, 212).

Figure 3A:
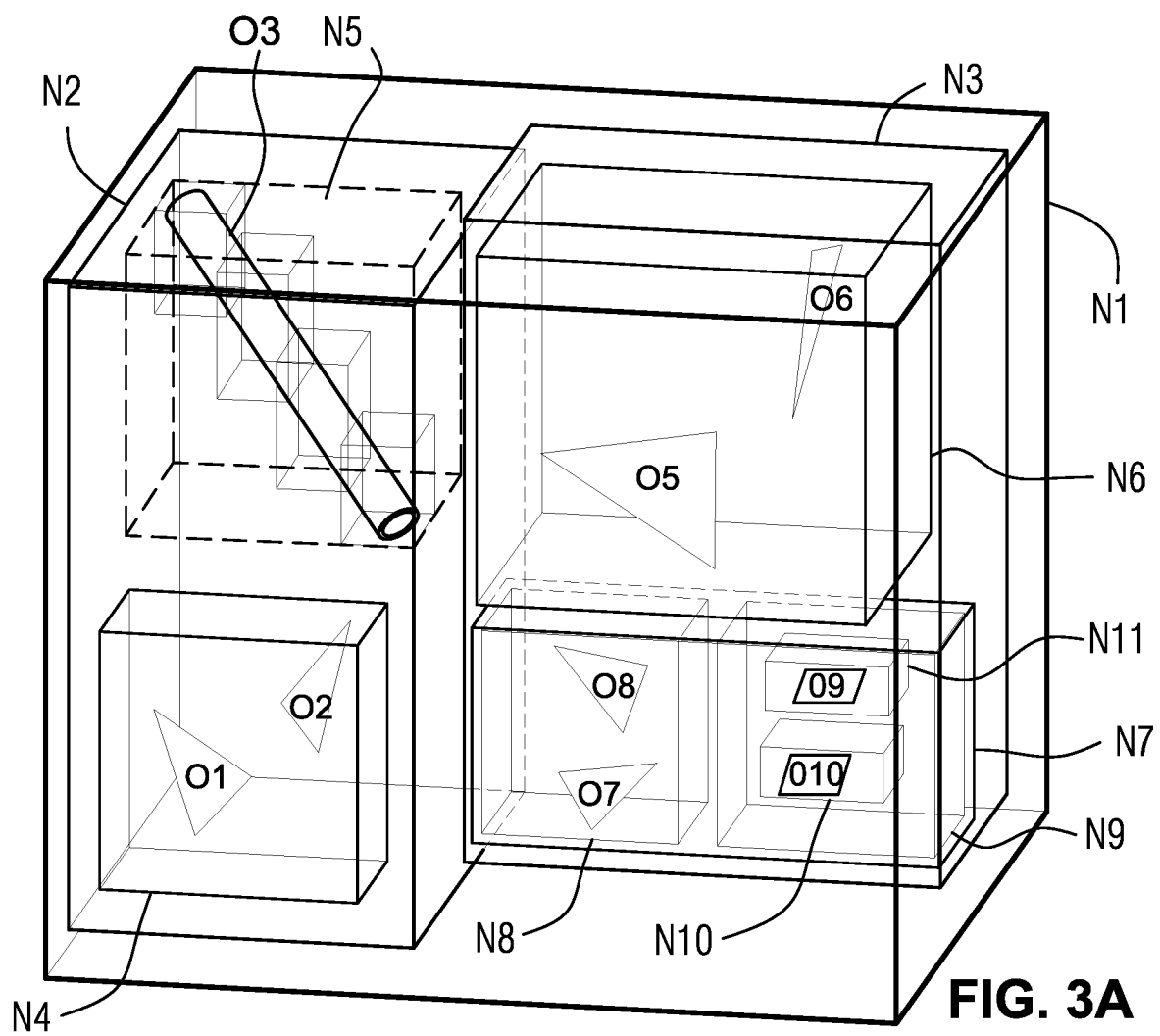
FIGS. 3A and 3B show example bounding volume hierarchy representations.
Figure 3B:
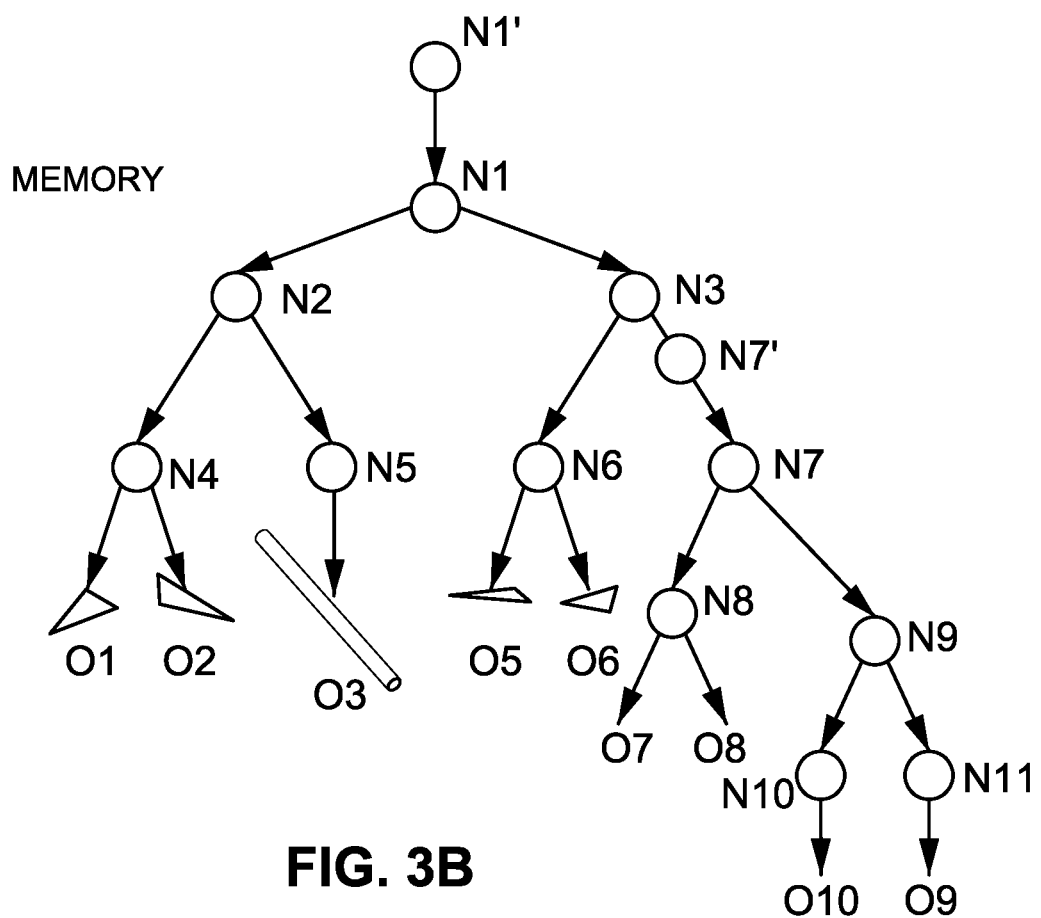

FIGS. 3A and 3B show a recursively-subdivided bounding volume of a 3D scene (FIG. 3A) and a corresponding tree data structure (FIG. 3B) that may be accessed by the ray tracer and used for hardware-accelerated operations. The tree data structure may be stored in memory and retrieved on demand based on queries.

The division of the bounding volumes may be represented in a hierarchical tree data structure with the large bounding volume represented by a parent node of the tree and the smaller bounding volumes represented by children nodes of the tree that are contained by the parent node. The smallest bounding volumes are represented as leaf nodes in the tree and identify one or more geometric primitives contained within these smallest bounding volumes.

The tree data structure includes a plurality of nodes arranged in a hierarchy. The root nodes N1 of the tree structure correspond to bounding volume N1 enclosing all of the primitives O1-O8. The root node N1 may identify the vertices of the bounding volume N1 and children nodes of the root node.

In FIG. 3A, bounding volume N1 is subdivided into bounding volumes N2 and N3. Children nodes N2 and N3 of the tree structure of FIG. 3B correspond to and represent the bounding volumes N2 and N3 shown in FIG. 3A. The children nodes N2 and N3 in the tree data structure identify the vertices of respective bounding volumes N2 and N3 in space. Each of the bounding volumes N2 and N3 is further subdivided in this particular example. Bounding volume N2 is subdivided into contained bounding volumes N4 and N5. Bounding volume N3 is subdivided into contained bounding volumes N6 and N7. Bounding volume N7 include two bounding volumes N8 and N9. Bounding volume N8 includes the triangles O7 and O8, and bounding volume N9 includes leaf bounding volumes N10 and N11 as its child bounding volumes. Leaf bounding volume N10 includes a primitive range (e.g., triangle range) O10 and leaf bounding volume N11 includes an item range O9. Respective children nodes N4, N5, N6, N8, N10 and N11 of the FIG. 3B tree structure correspond to and represent the FIG. 3A bounding volumes N4, N5, N6, N8, N10 and N11 in space.

The FIG. 3B tree in this particular example is only three to six levels deep so that volumes N4, N5, N6, N8, N10 and N11 constitute "leaf nodes"—that is, nodes in the tree that have no child nodes. FIG. 3A shows that leaf node bounding volumes N4, N6, and N8 each contains two triangles of the geometry in the scene. For example, volumetric subdivision N4 contains triangles O1 & O2; volumetric subdivision N6 contains trials O5 & O6; and volumetric subdivision N8 contains triangles O7 & O8. FIG. 3A further shows that leaf node bounding volume N5 contains a single cylinder O3 that does not provide a good fit for the AABB bounding volume N5 shown in dotted lines. Accordingly, in an example non-limiting embodiment herein, instead of using the larger AABB bounding volume N5 for the ray-bounding volume intersection test, TTU 138 instead tests the ray against a plurality of smaller AABB bounding volumes that are arranged, positioned, dimensioned and oriented to more closely fit cylinder O3.

The tree structure shown in FIG. 3B represents these leaf nodes N4, N5, N6, and N7 by associating them with the appropriate ones of primitive O1-O8 of the scene geometry. To access this scene geometry, the TTU 138 traverses the tree data structure of FIG. 3B down to the leaf nodes. In general, different parts of the tree can and will have different depths and contain different numbers of primitives. Leaf nodes associated with volumetric subdivisions that contain no geometry need not be explicitly represented in the tree data structure (i.e., the tree is "trimmed").

According to some embodiments, the subtree rooted at N7 may represent a set of bounding volumes or BVH that is defined in a different coordinate space than the bounding volumes corresponding to nodes N1-N3. When bounding volume N7 is in a different coordinate space from its parent bounding volume N3, an instance node N7' which provides the ray transformation necessary to traverse the subtree rooted at N7, may connect the rest of the tree to the subtree rooted at N7. Instance node N7' connects the bounding volume or BVH corresponding to nodes N1-N3, with the bounding volumes or BVH corresponding to nodes N7 etc. by defining the transformation from the coordinate space of N1-N3 (e.g., world space) to the coordinate space of N7 etc. (e.g., object space).

The acceleration structure constructed as described above can be used to advantage by software based graphics pipeline processes running on a conventional general purpose computer. However, the presently disclosed non-limiting embodiments advantageously implement the above-described techniques in the context of a hardware-based graphics processing unit including a high performance processors such as one or more streaming multiprocessors ("SMs") and one or more traversal co-processors or "tree traversal units" ("TTUs")—subunits of one or a group of streaming multiprocessor SMs of a 3D graphics processing pipeline. The following describes the overall structure and operation of such as system including a TTU 138 that accelerates certain processes supporting interactive ray tracing including ray-bounding volume intersection tests, ray-primitive intersection tests and ray "instance" transforms for real time ray tracing and other applications.

Example System Block Diagram

Figure 4:
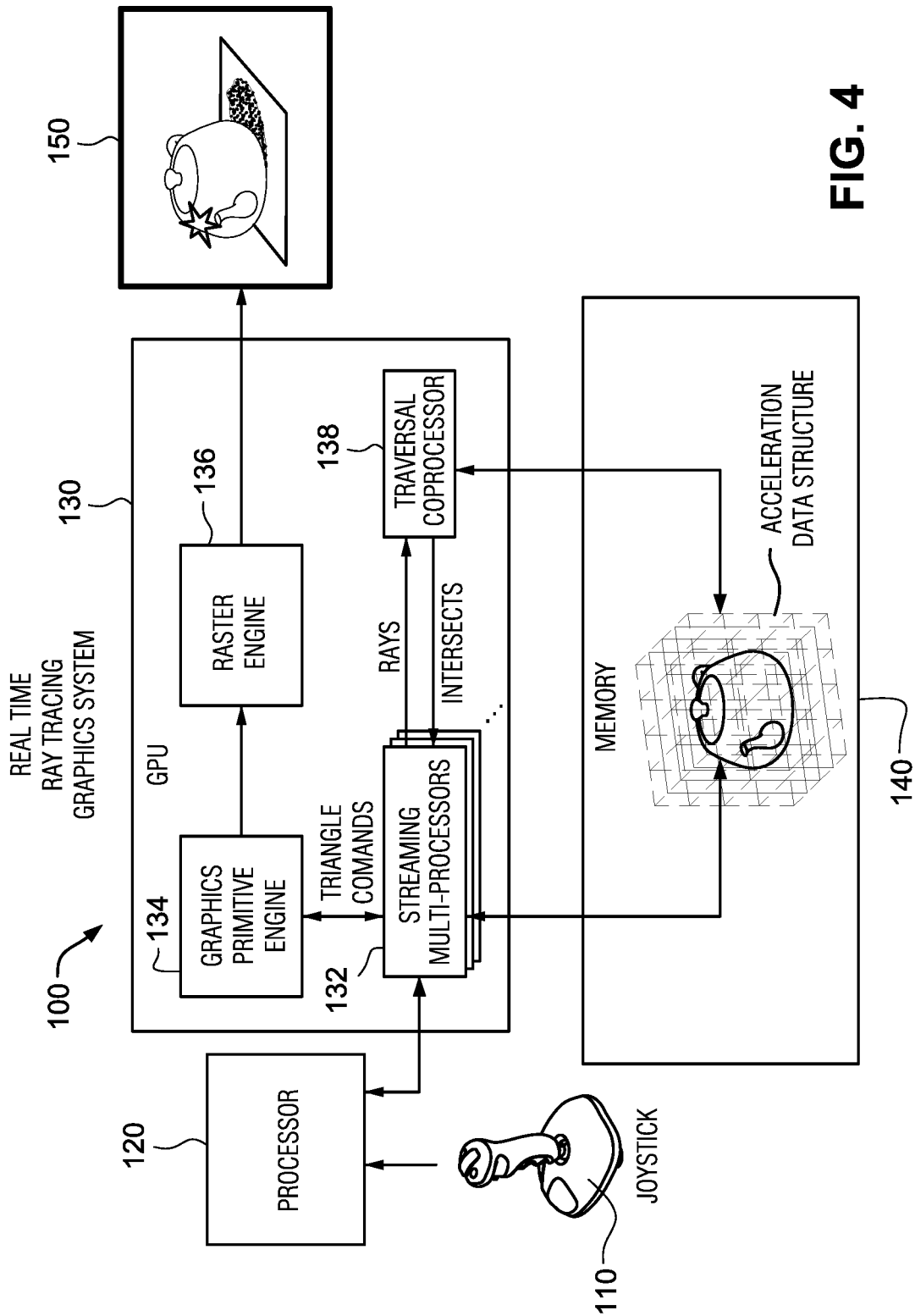
FIG. 4 illustrates an example non-limiting ray tracing graphics system.

FIG. 4 illustrates an example real time ray interactive tracing graphics system 100 for generating images using three dimensional (3D) data of a scene or object(s) including the acceleration data structure constructed as described above.

System 100 includes an input device 110, a processor(s) 120, a graphics processing unit(s) (GPU(s)) 130, memory 140, and a display(s) 150. The system shown in FIG. 4 can take on any form factor including but not limited to a personal computer, a smart phone or other smart device, a video game system, a wearable virtual or augmented reality system, a cloud-based computing system, a vehicle-mounted graphics system, a system-on-a-chip (SoC), etc.

The processor 120 may be a multicore central processing unit (CPU) operable to execute an application in real time interactive response to input device 110, the output of which includes images for display on display 150. Display 150 may be any kind of display such as a stationary display, a head mounted display such as display glasses or goggles, other types of wearable displays, a handheld display, a vehicle mounted display, etc. For example, the processor 120 may execute an application based on inputs received from the input device 110 (e.g., a joystick, an inertial sensor, an ambient light sensor, etc.) and instruct the GPU 130 to generate images showing application progress for display on the display 150.

Based on execution of the application on processor 120, the processor may issue instructions for the GPU 130 to generate images using 3D data stored in memory 140. The GPU 130 includes specialized hardware for accelerating the generation of images in real time. For example, the GPU 130 is able to process information for thousands or millions of graphics primitives (polygons) in real time due to the GPU's ability to perform repetitive and highly-parallel specialized computing tasks such as polygon scan conversion much faster than conventional software-driven CPUs. For example, unlike the processor 120, which may have multiple cores with lots of cache memory that can handle a few software threads at a time, the GPU 130 may include hundreds or thousands of processing cores or "streaming multiprocessors" (SMs) 132 running in parallel.

In one example embodiment, the GPU 130 includes a plurality of programmable high performance processors that can be referred to as "streaming multiprocessors" ("SMs") 132, and a hardware-based graphics pipeline including a graphics primitive engine 134 and a raster engine 136. These components of the GPU 130 are configured to perform real-time image rendering using a technique called "scan conversion rasterization" to display three-dimensional scenes on a two-dimensional display 150. In rasterization, geometric building blocks (e.g., points, lines, triangles, quads, meshes, etc.) of a 3D scene are mapped to pixels of the display (often via a frame buffer memory).

The GPU 130 converts the geometric building blocks (i.e., polygon primitives such as triangles) of the 3D model into pixels of the 2D image and assigns an initial color value for each pixel. The graphics pipeline may apply shading, transparency, texture and/or color effects to portions of the image by defining or adjusting the color values of the pixels. The final pixel values may be anti-aliased, filtered and provided to the display 150 for display. Many software and hardware advances over the years have improved subjective image quality using rasterization techniques at frame rates needed for real-time graphics (i.e., 30 to 60 frames per second) at high display resolutions such as 4096×2160 pixels or more on one or multiple displays 150.

To enable the GPU 130 to perform ray tracing in real time in an efficient manner, the GPU provides one or more "TTUs" 138 coupled to one or more SMs 132. The TTU 138 includes hardware components configured to perform (or accelerate) operations commonly utilized in ray tracing algorithms. A goal of the TTU 138 is to accelerate operations used in ray tracing to such an extent that it brings the power of ray tracing to real-time graphics application (e.g., games), enabling high-quality shadows, reflections, and global illumination. Results produced by the TTU 138 may be used together with or as an alternative to other graphics related operations performed in the GPU 130.

More specifically, SMs 132 and the TTU 138 may cooperate to cast rays into a 3D model and determine whether and where that ray intersects the model's geometry. Ray tracing directly simulates light traveling through a virtual environment or scene. The results of the ray intersections together with surface texture, viewing direction, and/or lighting conditions are used to determine pixel color values. Ray tracing performed by SMs 132 working with TTU 138 allows for computer-generated images to capture shadows, reflections, and refractions in ways that can be indistinguishable from photographs or video of the real world. Since ray tracing techniques are even more computationally intensive than rasterization due in part to the large number of rays that need to be traced, the TTU 138 is capable of accelerating in hardware certain of the more computationally-intensive aspects of that process.

Given a BVH constructed as described above, the TTU 138 performs a tree search where each node in the tree visited by the ray has a bounding volume for each descendent branch or leaf, and the ray only visits the descendent branches or leaves whose corresponding bound volume it intersects. In this way, TTU 138 explicitly tests only a small number of primitives for intersection, namely those that reside in leaf nodes intersected by the ray. In the example non-limiting embodiments, the TTU 138 accelerates both tree traversal (including the ray-volume tests) and ray-primitive tests. As part of traversal, it can also handle at least one level of instance transforms, transforming a ray from world-space coordinates into the coordinate system of an instanced mesh. In the example non-limiting embodiments, the TTU 138 does all of this in MIMD fashion, meaning that rays are handled independently once inside the TTU.

In the example non-limiting embodiments, the TTU 138 operates as a servant (coprocessor) to the SMs (streaming multiprocessors) 132. In other words, the TTU 138 in example non-limiting embodiments does not operate independently, but instead follows the commands of the SMs 132 to perform certain computationally-intensive ray tracing related tasks much more efficiently than the SMs 132 could perform themselves. In other embodiments or architectures, the TTU 138 could have more or less autonomy.

In the examples shown, the TTU 138 receives commands via SM 132 instructions and writes results back to an SM register file. For many common use cases (e.g., opaque triangles with at most one level of instancing), the TTU 138 can service the ray tracing query without further interaction with the SM 132. More complicated queries (e.g., involving alpha-tested triangles, primitives other than triangles, or multiple levels of instancing) may require multiple round trips (although the technology herein reduces the need for such "round trips" for certain kinds of geometry by providing the TTU 138 with enhanced capabilities to autonomously perform ray-bounding-volume intersection testing without the need to ask the calling SM for help). In addition to tracing rays, the TTU 138 is capable of performing more general spatial queries where an AABB or the extruded volume between two AABBs (which we call a "beam") takes the place of the ray. Thus, while the TTU 138 is especially adapted to accelerate ray tracing related tasks, it can also be used to perform tasks other than ray tracing.

The TTU 138 thus autonomously performs a test of each ray against a wide range of bounding volumes, and can cull any bounding volumes that don't intersect with that ray. Starting at a root node that bounds everything in the scene, the traversal co-processor tests each ray against smaller (potentially overlapping) child bounding volumes which in turn bound the descendent branches of the BVH. The ray follows the child pointers for the bounding volumes the ray hits to other nodes until the leaves or terminal nodes (volumes) of the BVH are reached.

Once the TTU 138 traverses the acceleration data structure to reach a terminal or "leaf" node (which may be represented by one or multiple bounding volumes) that intersects the ray and contains a geometric primitive, it performs an accelerated ray-primitive intersection test to determine whether the ray intersects that primitive (and thus the object surface that primitive defines). The ray-primitive test can provide additional information about primitives the ray intersects that can be used to determine the material properties of the surface required for shading and visualization. Recursive traversal through the acceleration data structure enables the traversal co-processor to discover all object primitives the ray intersects, or the closest (from the perspective of the viewpoint) primitive the ray intersects (which in some cases is the only primitive that is visible from the viewpoint along the ray). See e.g., Lefrancois et al, NVIDIA Vulkan Ray Tracing Tutorial, December 2019, https://developer.nvidia.com/rtx/raytracing/vkray As mentioned above, the TTU 138 also accelerates the transform of each ray from world space into object space to obtain finer and finer bounding box encapsulations of the primitives and reduce the duplication of those primitives across the scene. As described above, objects replicated many times in the scene at different positions, orientations and scales can be represented in the scene as instance nodes which associate a bounding box and leaf node in the world space BVH with a transformation that can be applied to the world-space ray to transform it into an object coordinate space, and a pointer to an object-space BVH. This avoids replicating the object space BVH data multiple times in world space, saving memory and associated memory accesses. The instance transform increases efficiency by transforming the ray into object space instead of requiring the geometry or the bounding volume hierarchy to be transformed into world (ray) space and is also compatible with additional, conventional rasterization processes that graphics processing performs to visualize the primitives.

Example Ray Tracing Processes

Figure 5:
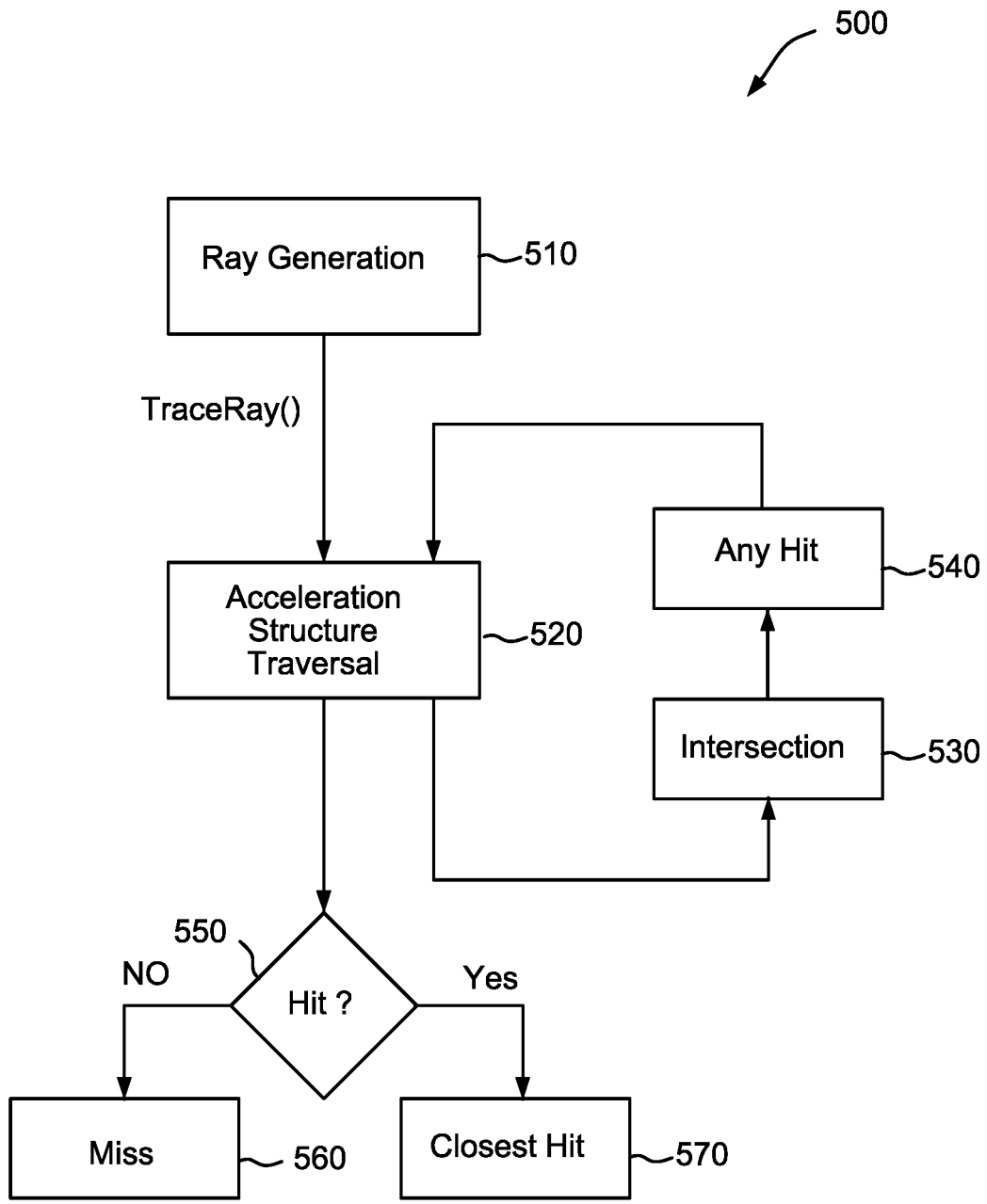
FIG. 5 is a flowchart of an example non-limiting ray tracing graphics pipeline.

FIG. 5 shows an exemplary ray tracing shading pipeline 500 that may be performed by SM 132 and accelerated by TTU 138. The ray tracing shading pipeline 500 starts by an SM 132 invoking ray generation 510 and issuing a corresponding ray tracing request to the TTU 138. The ray tracing request identifies a single ray cast into the scene and asks the TTU 138 to search for intersections with an acceleration data structure the SM 132 also specifies. The TTU 138 traverses (FIG. 5 block 520) the acceleration data structure to determine intersections or potential intersections between the ray and the volumetric subdivisions and associated triangles the acceleration data structure represents. Potential intersections can be identified by finding bounding volumes in the acceleration data structure that are intersected by the ray. Descendants of non-intersected bounding volumes need not be examined.

For triangles within intersected bounding volumes, a TTU 138 ray-primitive test block 720 performs an intersection 530 process to determine whether the ray intersects the primitives. As will be discussed in more detail below, the ray-primitive test block 720 may perform at least a portion of the operations related to determining whether a ray intersects a plurality of primitives sharing at least one vertex or edge. For example, the ray-primitive test block 720 may include circuitry configured to identify primitives sharing a feature (e.g., a vertex or an edge) and parallel circuitry configured to perform projection and transformation operations in parallel for two or more primitives sharing the feature.

The TTU 138 returns intersection information to the SM 132, which may perform an "any hit" shading operation 540 in response to the intersection determination. For example, the SM 132 may perform (or have other hardware perform) a texture lookup for an intersected primitive and decide based on the appropriate texel's value how to shade a pixel visualizing the ray. The SM 132 keeps track of such results since the TTU 138 may return multiple intersections with different geometry in the scene in arbitrary order.

Alternatively, primitives that the TTU 138 determines are intersected may be further processed to determine 550 whether they should be shaded as a miss 560 or as a closest hit 570. The SM 132 can for example instruct the TTU 138 to report a closest hit in the specified geometry, or it may instruct the TTU to report all hits in the specified geometry.

Figure 6:
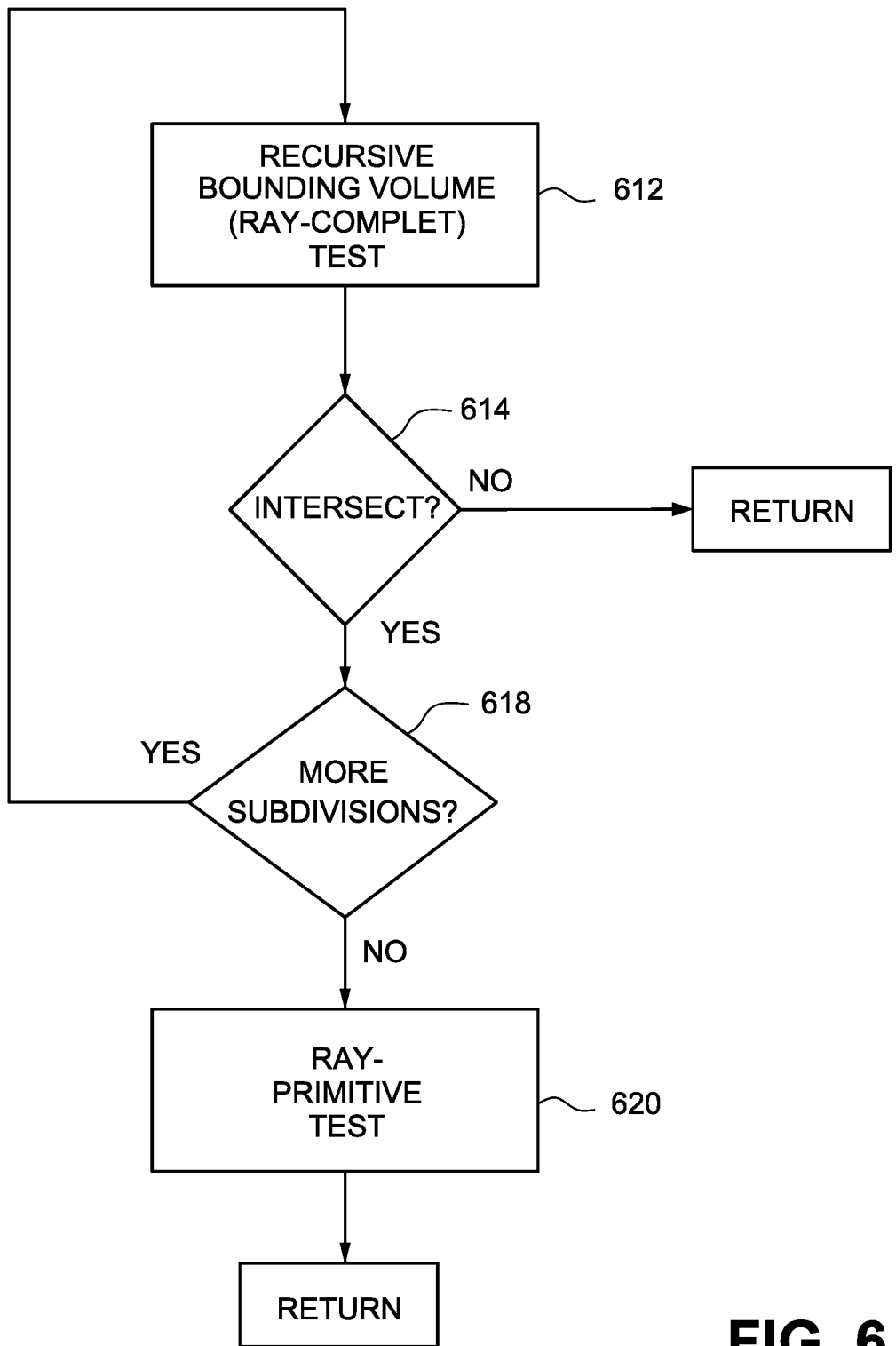
FIG. 6 is a flowchart of example non-limiting hardware based ray tracing operations.

FIG. 6 is a flowchart summarizing example ray tracing operations the TTU 138 performs as described above in cooperation with SM(s) 132. The FIG. 6 operations are performed by TTU 138 in cooperation with its interaction with an SM 132. The TTU 138 may thus receive the identification of a ray from the SM 132 and traversal state enumerating one or more nodes in one or more BVH's that the ray must traverse. The TTU 138 determines which bounding volumes of a BVH data structure the ray intersects (the "ray-complet" test 612). The TTU 138 can also subsequently determine whether the ray intersects one or more primitives in the intersected bounding volumes and which triangles are intersected (the "ray-primitive test" 620)—or the SM 132 can perform this test in software if it is too complicated for the TTU to perform itself. In example non-limiting embodiments, complets specify root or interior nodes (i.e., volumes) of the bounding volume hierarchy with children that are other complets or leaf nodes of a single type per complet.

First, the TTU 138 inspects the traversal state of the ray. If a stack the TTU 138 maintains for the ray is empty, then traversal is complete. If there is an entry on the top of the stack, the traversal co-processor 138 issues a request to the memory subsystem to retrieve that node. The traversal co-processor 138 then performs a bounding box test 612 to determine if a bounding volume of a BVH data structure is intersected by a particular ray the SM 132 specifies (step 612, 614). If the bounding box test determines that the bounding volume is not intersected by the ray ("No" in step 614), then there is no need to perform any further testing for visualization and the TTU 138 can return this result to the requesting SM 132. This is because if a ray misses a bounding volume (as in FIG. 1A with respect to bounding volume 10), then the ray will miss all other smaller bounding volumes inside the bounding volume being tested and any primitives that bounding volume contains.

If the bounding box test performed by the TTU 138 reveals that the bounding volume is intersected by the ray ("Yes" in Step 614), then the TTU determines if the bounding volume can be subdivided into smaller bounding volumes (step 618). In one example embodiment, the TTU 138 isn't necessarily performing any subdivision itself. Rather, each node in the BVH has one or more children (where each child is a leaf or a branch in the BVH). For each child, there is one or more bounding volumes and a pointer that leads to a branch or a leaf node. When a ray processes a node using TTU 138, it is testing itself against the bounding volumes of the node's children. The ray only pushes stack entries onto its stack for those branches or leaves whose representative bounding volumes were hit. When a ray fetches a node in the example embodiment, it doesn't test against the bounding volume of the node—it tests against the bounding volumes of the node's children. The TTU 138 pushes nodes whose bounding volumes are hit by a ray onto the ray's traversal stack in an order determined by ray configuration. For example, it is possible to push nodes onto the traversal stack in the order the nodes appear in memory, or in the order that they appear along the length of the ray, or in some other order. If there are further subdivisions of the bounding volume ("Yes" in step 618), then those further subdivisions of the bounding volume are accessed and the bounding box test is performed for each of the resulting subdivided bounding volumes to determine which subdivided bounding volumes are intersected by the ray and which are not. In this recursive process, some of the bounding volumes may be eliminated by test 614 while other bounding volumes may result in still further and further subdivisions being tested for intersection by TTU 138 recursively applying steps 612-618.

Once the TTU 138 determines that the bounding volumes intersected by the ray are leaf nodes ("No" in step 518), the TTU 138 and/or SM 132 performs a primitive (e.g., triangle) intersection test 620 to determine whether the ray intersects primitives in the intersected bounding volumes and which primitives the ray intersects. The TTU 138 thus performs a depth-first traversal of intersected descendent branch nodes until leaf nodes are reached. The TTU 138 processes the leaf nodes. If the leaf nodes are primitive ranges, the TTU 138 or the SM 132 tests them against the ray. If the leaf nodes are instance nodes, the TTU 138 or the SM 132 applies the instance transform. If the leaf nodes are item ranges, the TTU 138 returns them to the requesting SM 132. In the example non-limiting embodiments, the SM 132 can command the TTU 138 to perform different kinds of ray-primitive intersection tests and report different results depending on the operations coming from an application (or an software stack the application is running on) and relayed by the SM to the TTU. For example, the SM 132 can command the TTU 138 to report the nearest visible primitive revealed by the intersection test, or to report all primitives the ray intersects irrespective of whether they are the nearest visible primitive. The SM 132 can use these different results for different kinds of visualization. Or the SM 132 can perform the ray-primitive intersection test itself once the TTU 138 has reported the ray-complet test results. Once the TTU 138 is done processing the leaf nodes, there may be other branch nodes (pushed earlier onto the ray's stack) to test.

Example Non-Limiting TTU 138 Hardware Implementation

Figure 7:
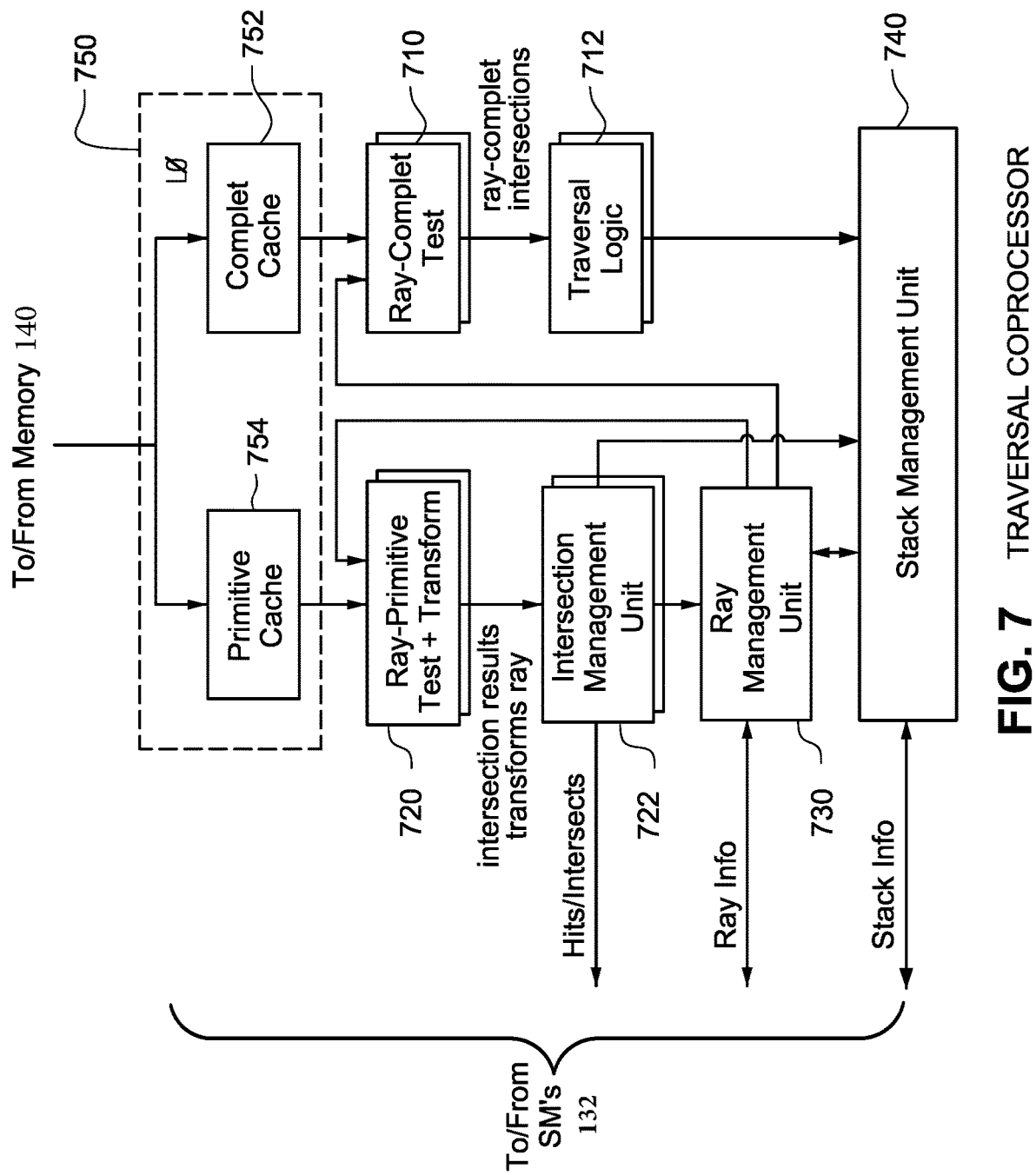
FIG. 7 shows a simplified example non-limiting traversal co-processor comprising a tree traversal unit (TTU).

FIG. 7 shows an example simplified block diagram of TTU 138 including hardware configured to perform accelerated traversal operations as described above. In some embodiments, the TTU 138 may perform a depth-first traversal of a bounding volume hierarchy using a short stack traversal with intersection testing of supported leaf node primitives and mid-traversal return of alpha primitives and unsupported leaf node primitives (items). The TTU 138 includes dedicated hardware to determine whether a ray intersects bounding volumes and dedicated hardware to determine whether a ray intersects primitives of the tree data structure.

In more detail, TTU 138 includes an intersection management block 722, a ray management block 730 and a stack management block 740. Each of these blocks (and all of the other blocks in FIG. 7) may constitute dedicated hardware implemented by logic gates, registers, hardware-embedded lookup tables or other combinatorial logic, etc.

The ray management block 730 is responsible for managing information about and performing operations concerning a ray specified by an SM 132 to the ray management block. The stack management block 740 works in conjunction with traversal logic 712 to manage information about and perform operations related to traversal of a BVH acceleration data structure. Traversal logic 712 is directed by results of a ray-complet test block 710 that tests intersections between the ray indicated by the ray management block 730 and volumetric subdivisions represented by the BVH, using instance transforms as needed. The ray-complet test block 710 retrieves additional information concerning the BVH from memory 140 via an L0 complet cache 752 that is part of the TTU 138. The results of the ray-complet test block 710 informs the traversal logic 712 as to whether further recursive traversals are needed. The stack management block 740 maintains stacks to keep track of state information as the traversal logic 712 traverses from one level of the BVH to another, with the stack management block 740 pushing items onto the stack as the traversal logic traverses deeper into the BVH and popping items from the stack as the traversal logic traverses upwards in the BVH. The stack management block 740 is able to provide state information (e.g., intermediate or final results) to the requesting SM 132 at any time the SM requests.

The intersection management block 722 manages information about and performs operations concerning intersections between rays and primitives, using instance transforms as needed. The ray-primitive test block 720 retrieves information concerning geometry from memory 140 on an asneeded basis via an L0 primitive cache 754 that is part of TTU 138. The intersection management block 722 is informed by results of intersection tests the ray-primitive test and transform block 720 performs. Thus, the ray-primitive test and transform block 720 provides intersection results to the intersection management block 722, which reports geometry hits and intersections to the requesting SM 132.

A Stack Management Unit 740 inspects the traversal state to determine what type of data needs to be retrieved and which data path (complet or primitive) will consume it. The intersections for the bounding volumes are determined in the ray-complet test path of the TTU 138 including one or more ray-complet test blocks 710 and one or more traversal logic blocks 712. A complet specifies root or interior nodes of a bounding volume. Thus, a complet may define one or more bounding volumes for the ray-complet test. In example embodiments herein, a complet may define a plurality of "child" bounding volumes that (whether or not they represent leaf nodes) that don't necessarily each have descendants but which the TTU will test in parallel for ray-bounding volume intersection to determine whether geometric primitives associated with the plurality of bounding volumes need to be tested for intersection.

The ray-complet test path of the TTU 138 identifies which bounding volumes are intersected by the ray. Bounding volumes intersected by the ray need to be further processed to determine if the primitives associated with the intersected bounding volumes are intersected. The intersections for the primitives are determined in the ray-primitive test path including one or more ray-primitive test and transform blocks 720 and one or more intersection management blocks 722.

The TTU 138 receives queries from one or more SMs 132 to perform tree traversal operations. The query may request whether a ray intersects bounding volumes and/or primitives in a BVH data structure. The query may identify a ray (e.g., origin, direction, and length of the ray) and a BVH data structure and traversal state (short stack) which includes one or more entries referencing nodes in one or more Bounding Volume Hierarchies that the ray is to visit. The query may also include information for how the ray is to handle specific types of intersections during traversal. The ray information may be stored in the ray management block 730. The stored ray information (e.g., ray length) may be updated based on the results of the ray-primitive test.

The TTU 138 may request the BVH data structure identified in the query to be retrieved from memory outside of the TTU 138. Retrieved portions of the BVH data structure may be cached in the level-zero (L0) cache 750 within the TTU 138 so the information is available for other time-coherent TTU operations, thereby reducing memory 140 accesses. Portions of the BVH data structure needed for the ray-complet test may be stored in a L0 complet cache 752 and portions of the BVH data structure needed for the ray-primitive test may be stored in an L0 primitive cache 754.

After the complet information needed for a requested traversal step is available in the complet cache 752, the ray-complet test block 710 determines bounding volumes intersected by the ray. In performing this test, the ray may be transformed from the coordinate space of the bounding volume hierarchy to a coordinate space defined relative to a complet. The ray is tested against the bounding boxes associated with the child nodes of the complet. In the example non-limiting embodiment, the ray is not tested against the complet's own bounding box because (1) the TTU 138 previously tested the ray against a similar bounding box when it tested the parent bounding box child that referenced this complet, and (2) a purpose of the complet bounding box is to define a local coordinate system within which the child bounding boxes can be expressed in compressed form. If the ray intersects any of the child bounding boxes, the results are pushed to the traversal logic to determine the order that the corresponding child pointers will be pushed onto the traversal stack (further testing will likely require the traversal logic 712 to traverse down to the next level of the BVH). These steps are repeated recursively until intersected leaf nodes of the BVH are encountered The ray-complet test block 710 may provide ray-complet intersections to the traversal logic 712. Using the results of the ray-complet test, the traversal logic 712 creates stack entries to be pushed to the stack management block 740. The stack entries may indicate internal nodes (i.e., a node that includes one or more child nodes) that need to be further tested for ray intersections by the ray-complet test block 710 and/or triangles identified in an intersected leaf node that need to be tested for ray intersections by the ray-primitive test and transform block 720. The ray-complet test block 710 may repeat the traversal on internal nodes identified in the stack to determine all leaf nodes in the BVH that the ray intersects. The precise tests the ray-complet test block 710 performs will in the example non-limiting embodiment be determined by mode bits, ray operations (see below) and culling of hits, and the TTU 138 may return intermediate as well as final results to the SM 132.

Ray-Primitive Intersection Testing

Referring again to FIG. 7, the TTU 138 also has the ability to accelerate intersection tests that determine whether a ray intersects particular geometry or primitives. For some cases, the geometry is sufficiently complex (e.g., defined by curves or other abstract constructs as opposed to e.g., vertices) that TTU 138 in some embodiments may not be able to help with the ray-primitive intersection testing. In such cases, the TTU 138 simply reports the ray-complet intersection test results to the SM 132, and the SM 132 performs the ray-primitive intersection test itself. In other cases (e.g., triangles), the TTU 138 can perform the ray-triangle intersection test itself, thereby further increasing performance of the overall ray tracing process. For sake of completeness, the following describes how the TTU 138 can perform or accelerate the ray-primitive intersection testing.

As explained above, leaf nodes found to be intersected by the ray identify (enclose) primitives that may or may not be intersected by the ray. One option is for the TTU 138 to provide e.g., a range of geometry identified in the intersected leaf nodes to the SM 132 for further processing. For example, the SM 132 may itself determine whether the identified primitives are intersected by the ray based on the information the TTU 138 provides as a result of the TTU traversing the BVH. To offload this processing from the SM 132 and thereby accelerate it using the hardware of the TTU 138, the stack management block 740 may issue requests for the ray-primitive and transform block 720 to perform a ray-primitive test for the primitives within intersected leaf nodes the TTU's ray-complet test block 710 identified. In some embodiments, the SM 132 may issue a request for the ray-primitive test to test a specific range of primitives and transform block 720 irrespective of how that geometry range was identified.

After making sure the primitive data needed for a requested ray-primitive test is available in the primitive cache 754, the ray-primitive and transform block 720 may determine primitives that are intersected by the ray using the ray information stored in the ray management block 730. The ray-primitive test block 720 provides the identification of primitives determined to be intersected by the ray to the intersection management block 722.

The intersection management block 722 can return the results of the ray-primitive test to the SM 132. The results of the ray-primitive test may include identifiers of intersected primitives, the distance of intersections from the ray origin and other information concerning properties of the intersected primitives. In some embodiments, the intersection management block 722 may modify an existing ray-primitive test (e.g., by modifying the length of the ray) based on previous intersection results from the ray-primitive and transform block 720.

The intersection management block 722 may also keep track of different types of primitives. For example, the different types of triangles include opaque triangles that will block a ray when intersected and alpha triangles that may or may not block the ray when intersected or may require additional handling by the SM. Whether a ray is blocked or not by a transparent triangle may for example depend on texture(s) mapped onto the triangle, area of the triangle occupied by the texture and the way the texture modifies the triangle. For example, transparency (e.g., stained glass) in some embodiments requires the SM 132 to keep track of transparent object hits so they can be sorted and shaded in ray-parametric order, and typically don't actually block the ray. Meanwhile, alpha "trimming" allows the shape of the primitive to be trimmed based on the shape of a texture mapped onto the primitive—for example, cutting a leaf shape out of a triangle. (Note that in raster graphics, transparency is often called "alpha blending" and trimming is called "alpha test"). In other embodiments, the TTU 138 can push transparent hits to queues in memory for later handling by the SM 132 and directly handle trimmed triangles by sending requests to the texture unit. Each triangle may include a designator to indicate the triangle type. The intersection management block 722 is configured to maintain a result queue for tracking the different types of intersected triangles. For example, the result queue may store one or more intersected opaque triangle identifiers in one queue and one or more transparent triangle identifiers in another queue.

For opaque triangles, the ray intersection for less complex geometry can be fully determined in the TTU 138 because the area of the opaque triangle blocks the ray from going past the surface of the triangle. For transparent triangles, ray intersections cannot in some embodiments be fully determined in the TTU 138 because TTU 138 performs the intersection test based on the geometry of the triangle and may not have access to the texture of the triangle and/or area of the triangle occupied by the texture (in other embodiments, the TTU may be provided with texture information by the texture mapping block of the graphics pipeline). To fully determine whether the triangle is intersected, information about transparent triangles the ray-primitive and transform block 720 determines are intersected may be sent to the SM 132, for the SM to make the full determination as to whether the triangle affects visibility along the ray.

The SM 132 can resolve whether or not the ray intersects a texture associated with the transparent triangle and/or whether the ray will be blocked by the texture. The SM 132 may in some cases send a modified query to the TTU 138 (e.g., shortening the ray if the ray is blocked by the texture) based on this determination. In one embodiment, the TTU 138 may be configured to return all triangles determined to intersect the ray to the SM 132 for further processing.

Because returning every triangle intersection to the SM 132 for further processing is costly in terms of interface and thread synchronization, the TTU 138 may be configured to hide triangles which are intersected but are provably capable of being hidden without a functional impact on the resulting scene. For example, because the TTU 138 is provided with triangle type information (e.g., whether a triangle is opaque or transparent), the TTU 138 may use the triangle type information to determine intersected triangles that are occluded along the ray by another intersecting opaque triangle and which thus need not be included in the results because they will not affect the visibility along the ray. If the TTU 138 knows that a triangle is occluded along the ray by an opaque triangle, the occluded triangle can be hidden from the results without impact on visualization of the resulting scene.

The intersection management block 722 may include a result queue for storing hits that associate a triangle ID and information about the point where the ray hit the triangle. When a ray is determined to intersect an opaque triangle, the identity of the triangle and the distance of the intersection from the ray origin can be stored in the result queue. If the ray is determined to intersect another opaque triangle, the other intersected opaque triangle can be omitted from the result if the distance of the intersection from the ray origin is greater than the distance of the intersected opaque triangle already stored in the result queue. If the distance of the intersection from the ray origin is less than the distance of the intersected opaque triangle already stored in the result queue, the other intersected opaque triangle can replace the opaque triangle stored in the result queue. After all of the triangles of a query have been tested, the opaque triangle information stored in the result queue and the intersection information may be sent to the SM 132.

In some embodiments, once an opaque triangle intersection is identified, the intersection management block 722 may shorten the ray stored in the ray management block 730 so that bounding volumes (which may include triangles) behind the intersected opaque triangle (along the ray) will not be identified as intersecting the ray.

The intersection management block 722 may store information about intersected transparent triangles in a separate queue. The stored information about intersected transparent triangles may be sent to the SM 132 for the SM to resolve whether or not the ray intersects a texture associated with the triangle and/or whether the texture blocks the ray. The SM may return the results of this determination to the TTU 138 and/or modify the query (e.g., shorten the ray if the ray is blocked by the texture) based on this determination.

As discussed above, the TTU 138 allows for quick traversal of an acceleration data structure (e.g., a BVH) to determine which primitives (e.g., triangles used for generating a scene) in the data structure are intersected by a query data structure (e.g., a ray). For example, the TTU 138 may determine which triangles in the acceleration data structure are intersected by the ray and return the results to the SM 132. However, returning to the SM 132 a result on every triangle intersection is costly in terms of interface and thread synchronization. The TTU 138 provides a hardware logic configured to hide those items or triangles which are provably capable of being hidden without a functional impact on the resulting scene. The reduction in returns of results to the SM and synchronization steps between threads greatly improves the overall performance of traversal. The example non-limiting embodiments of the TTU 138 disclosed in this application provides for some of the intersections to be discarded within the TTU 138 without SM 132 intervention so that less intersections are returned to the SM 132 and the SM 132 does not have to inspect all intersected triangles or item ranges.

Example Ray-Primitive Traversal Implementation

Exemplary non-limiting embodiments of this disclosure provide a TTU 138 including hardware circuitry configured to determine intersections for a plurality of primitives sharing one or more features (e.g., at least one common vertex or at least two common vertices defining a common edge), while minimizing hardware configuration and associated area on a semiconductor substrate. At least a portion of the processing (e.g., projections and/or transformations) performed in testing the primitive for intersection with the ray may be performed in parallel for the primitives sharing such one or more features.

Figure 1B:
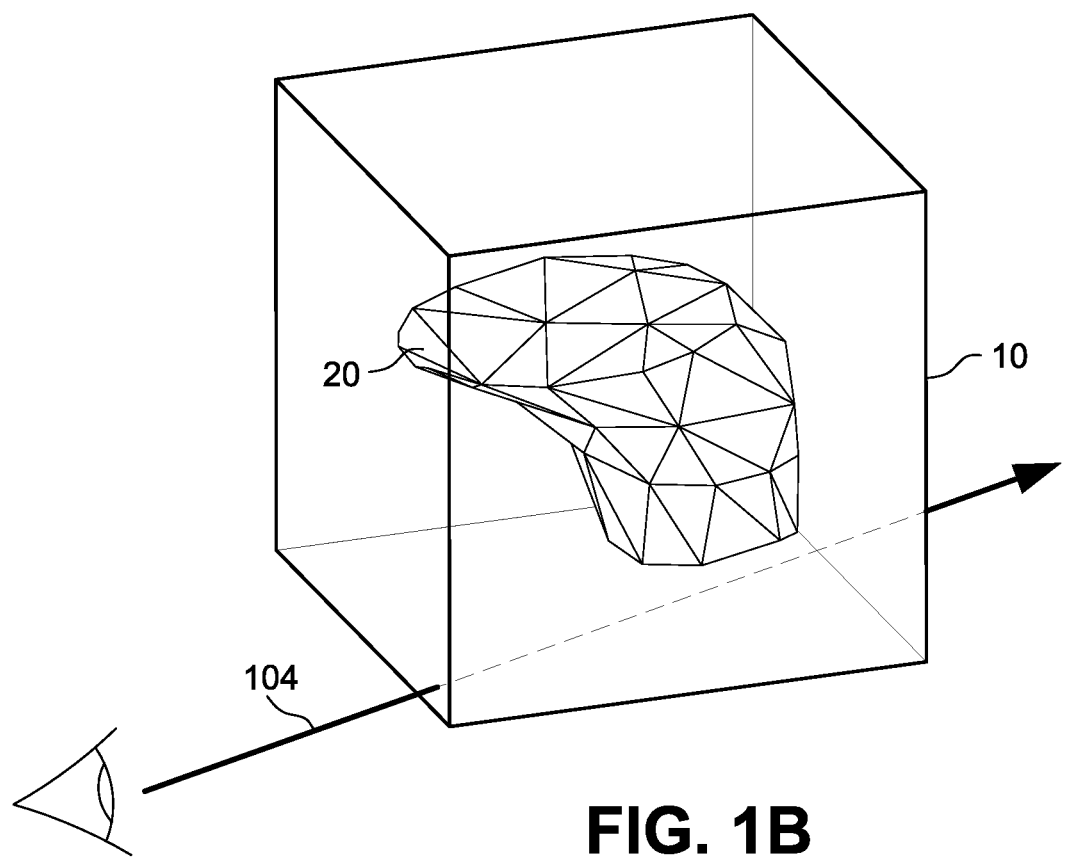
Figure 1C:
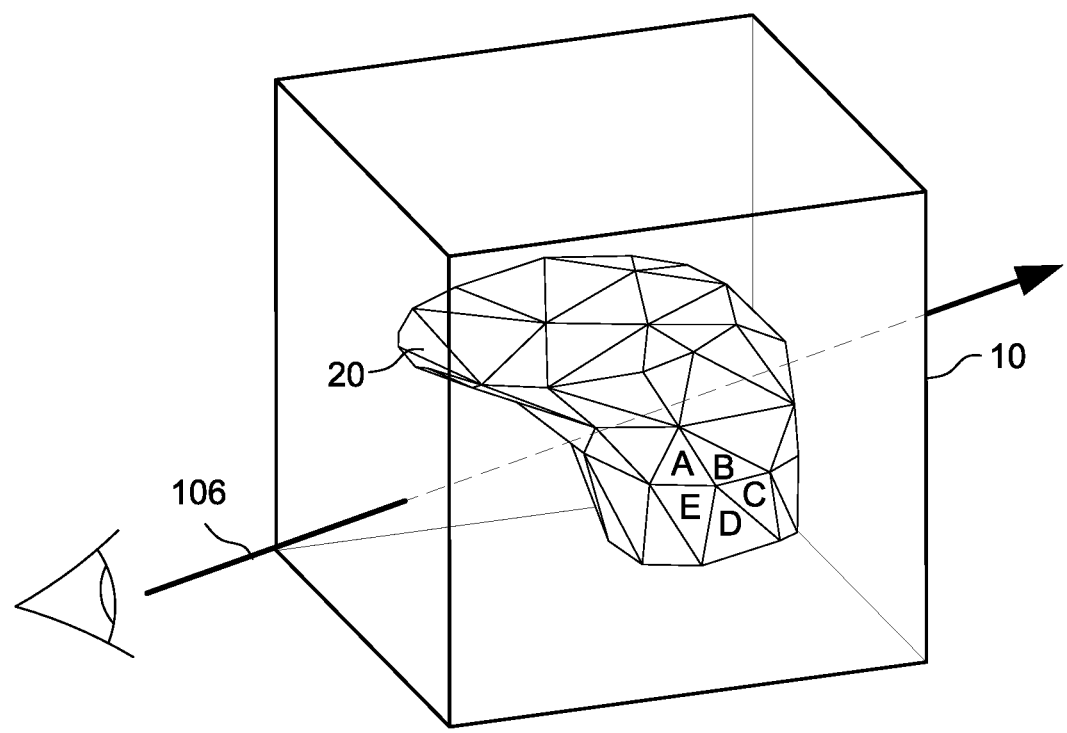

The plurality of primitives sharing one or more features includes primitives sharing at least one vertex. As an example, five triangles A, B, C, D, and E sharing a vertex are shown in FIG. 1C. Examples of the present technology provide circuitry configured to perform the ray-triangle intersection test that uses the processing results related to the shared vertex across the testing of plural triangles sharing the vertex. Such circuitry allows for the reduced circuitry components because there is no need to replicate the processing hardware to repeat identical processing for the shared vertex.

As shown in FIG. 1C, triangles A and B also share an edge, defined by two shared vertices. Examples of the present technology provide circuitry configured to perform the ray-triangle intersection test that uses the processing results related to the shared edge (the two shared vertices) from one triangle in the processing performed for the second triangle sharing the edge. Such circuitry allows for the reduced circuitry components because there is no need to repeat the processing for the shared edge (the two shared vertices).

Because many primitives in a typical polygon mesh share a vertex or an edge with another primitive (see e.g., FIGS. 1A-1C), the circuitry according to examples of the present technology can increase processing speed of primitives identified in an intersected bounding volume (e.g., a primitive range), with minimal increase in processing circuitry.

Figure 8:
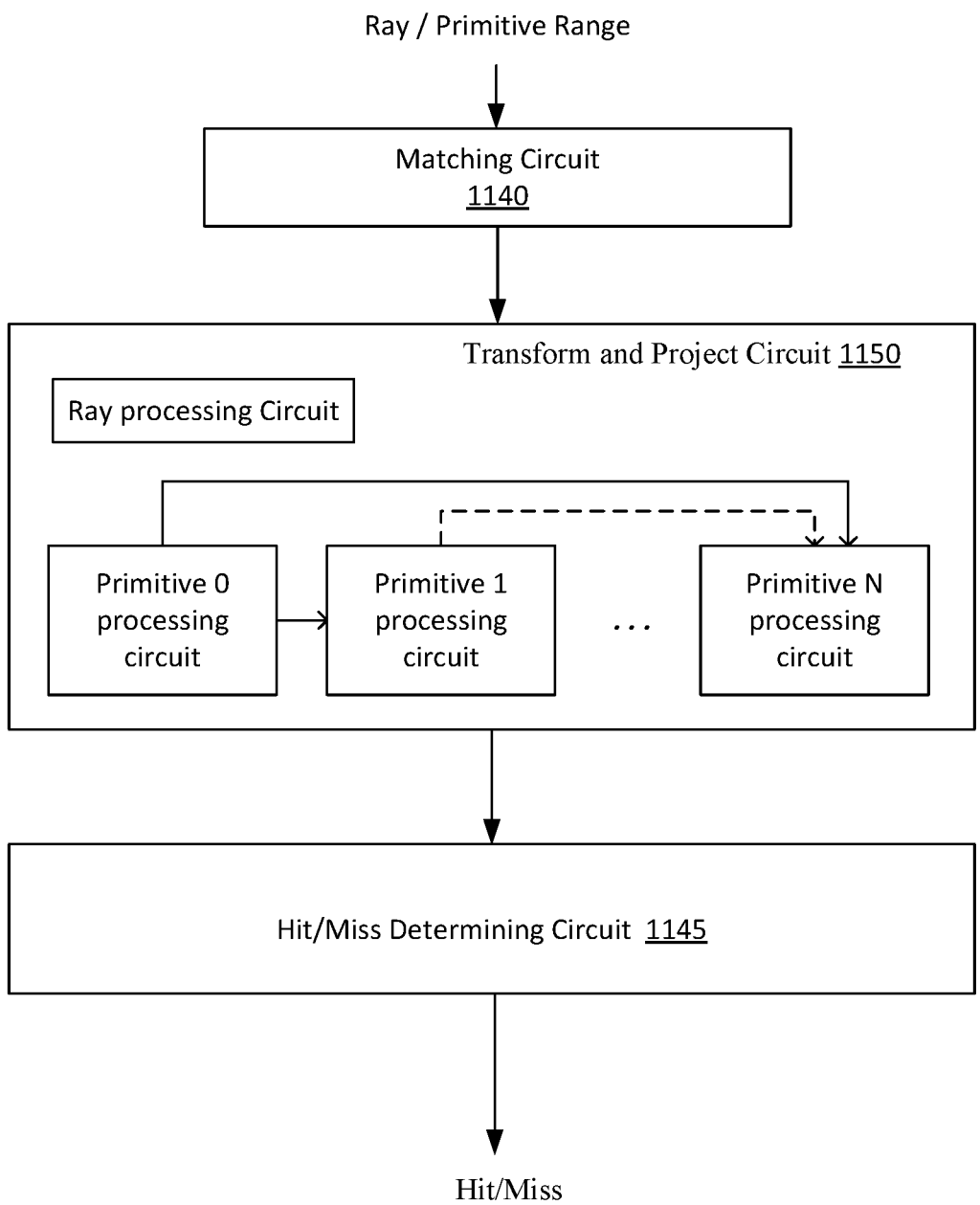
FIG. 8 illustrates a ray-primitive test unit for performing ray-primitive intersection testing according to an exemplary embodiment of this disclosure.

FIG. 8 illustrates a ray-primitive test unit for performing ray-primitive intersection test according to an exemplary embodiment of this disclosure. The ray-primitive test unit includes a matching circuit 1140, a transform and project circuit 1150 and a hit/miss determining circuit 1145.

The matching circuit 1140 may be configured to match primitives in a primitive range having at least one shared feature (e.g., a vertex or an edge). The matching may be performed based on vertex values, vertex indices provided in a compressed cache line, matches identified external to the ray-primitive test unit, and/or matching identification provided with the primitive information. In one example, the matching circuit 1140 may determine matching across primitives within a retrieved memory block(s) and/or a range of primitives. In one example, the matching circuit 1140 may determine whether a "next" primitive(s) to be tested in a sequence for intersection has a shared feature with another primitive (e.g., subsequent) in a range of primitives.

If no match is found, the transform and project circuit 1150 may process a single primitive. For example, the transform and project circuit 1150 may transform the ray and/or the vertices of the primitive received for processing into a different coordinate system (e.g., between world space and object space) for the ray intersection test. After the primitive is processed, a subsequent primitive in the primitive range can be tested processed by the transform and project circuit 1150. There can be multiple parallel transform and project circuits 1150 that process individual non-matching primitives in parallel to increase throughput.

If matching circuit 1140 detects that there is a match (i.e., two or more primitives share a common vertex or edge), the transform and project circuit 1150 may process a plurality of primitives including the at least one shared feature and share processing results related to the shared feature between the processing of the different primitives. In one example, at least a portion of the processing related to the plurality of primitives sharing the at least one feature may be performed concurrently in parallel. In one embodiment, an accumulation buffer could be used to retain results from processing a first primitive of use in processing an additional primitive(s) that shares a common vertex or edge with the first primitive.

The transform and project circuit 1150 may share the result of transforming the ray and/or primitive vertices between coordinate systems to simplify the ray intersection test. The transformations may be performed in parallel for a plurality of primitives that share a common vertex or edge.

The Hit/Miss determining circuit 1145 may be configured to determine if the one or more primitives are intersected by the ray based on the transformed ray and/or vertices.

For example, the primitive 0 processing circuit shown in FIG. 8 may include hardware to process each vertex of a first primitive 0. The primitive processing circuits 1-N may perform processing related to at least one vertex of primitives 1-N, respectively, and receive processing results to vertices these primitives 1-N share with primitive 0 from the primitive 0 processing circuit. Because the primitive processing circuits 1-N can utilize some of the processing results determined by the primitive 0 processing circuit, each of the primitive processing circuits 1-N can be simplified relative to the primitive 0 processing circuit to include only a portion of the hardware included in the primitive 0 processing circuit. For example, in one embodiment that processes triangles, primitive processing circuits 1-N each perform certain calculations for only a single vertex, and rely on calculations performed by primitive 0 processing circuit for the other two vertices.

In some examples, one or more of the primitive processing circuits may receive processing from more than one other primitive processing circuit. As shown in FIG. 8, primitive processing circuit N may receive processing results from each of primitive processing circuit 0 and primitive processing circuit 1.

The Hit/Miss determining circuit 1145 may determine a hit or miss for each of the primitives based on the results provided by the primitive processing circuits 0-N. The Hit/Miss determining circuit 1145 may determine, in parallel or sequentially, a hit/miss for the plurality of primitives sharing a feature.

Each of the primitive processing circuits 0-N receiving primitive information for processing may provide processing results every cycle. The Hit/Miss determining circuit 1145 may determine, based on the processing results from the primitive processing circuits 0-N, whether the ray hits or misses each of the primitives. In one example, Hit/Miss determining circuit 1145 may provide intersection results (e.g., ray intersection coordinates and/or parametric length of the ray intersection) for primitives intersected by the ray, one intersection result per cycle.

With reference to FIG. 8, because the primitive processing circuits 1-N do not need to include every processing element included in the primitive processing circuit 0, the transform and project circuit 1150 can process a plurality of primitives without a corresponding proportional increase in hardware complexity.

The transform and project circuit 1150 may receive a ray in the ray-coordinate space and transform the ray into the object space or receive the ray transformed into the object space.

Testing Triangles Sharing an Edge for Intersection with a Ray

Figure 9A:
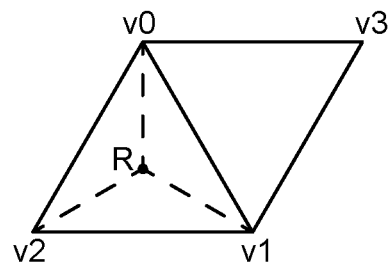
FIGS. 9A-9C show examples of a pair of adjacent triangles intersected by a ray.
Figure 9B:
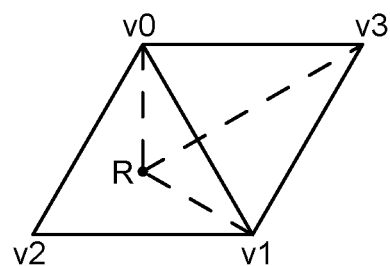

A triangle is composed of three vertices defining three edges. Two distinct triangles are defined by six vertices (3 vertices for each triangle), but a pair of adjacent triangles that share a common edge can be defined with just four unique vertices. As shown in FIGS. 9A and 9B, vertices v0, v1 and v2 define a first triangle (see FIG. 9A) and vertices v0, v1 and v3 define a second triangle (see FIG. 9B). The edge defined by vertices v0 and v1 is shared by the two triangles.

FIGS. 9A and 9B show a location where a ray R intersects the first triangle. Testing the triangles for intersections may include testing a first triangle for intersection by the ray followed by testing the second triangle for intersection by the ray.

In FIG. 9A, the ray R is tested for intersection with the first triangle. In FIG. 9B, the ray R is tested for intersection with the second triangle. The dotted lines represent the barycentric coordinates for the ray R. Barycentric coordinates are used to express the position of a point (e.g., ray R) located inside or outside of the triangle with three scalar values. If all of the signs of the three values are positive or all of the signs of the three values are negative, then the triangle is intersected by the ray as shown in FIG. 9A. If the sign of one of the three values is different from the other values, then the triangle is not intersected by the ray, as shown in FIG. 9B.

Instead of separately processing each triangle of a pair of triangles sharing an edge (e.g., in sequence with the same hardware or in parallel by separate hardware that is duplicated), embodiments of the present technology provide hardware configured to merge the ray intersection test for the pair of triangle sharing an edge. Examples of the present technology provide hardware that can double the ray intersection testing rate of a pair of triangles sharing an edge without doubling the hardware needed to perform the test, by expanding hardware to handle one more vertex.

Figure 9C:
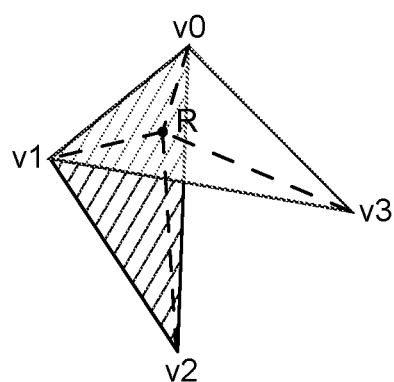

Examples of the present technology can also be applied to overlapping triangles sharing an edge. FIG. 9C illustrates two three-dimensional triangles projected down to two dimensions. FIG. 9C shows a ray intersecting a first triangle (v0, v1, v2) and a second triangle (v0, v1, v3) overlapping the first triangle. In the example shown in FIG. 9C, the ray intersects both triangles at point R.

Example Ray-Triangle Test Unit

Figure 10:
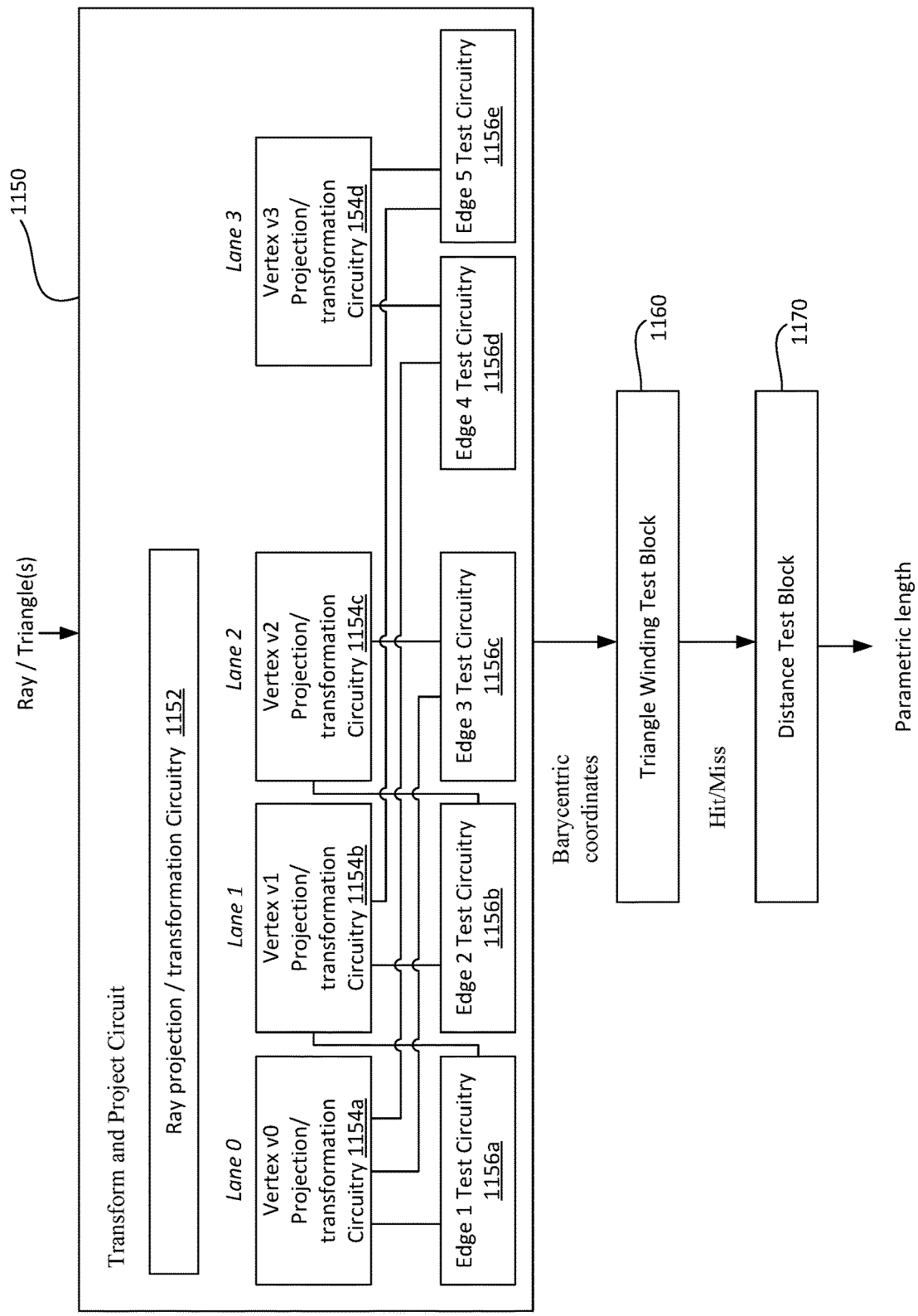
FIG. 10 illustrates a hardware ray-triangle test unit for performing ray-triangle intersection testing according to an exemplary embodiment of this disclosure.

FIG. 10 illustrates a ray-triangle test unit for performing ray-triangle intersection test according to an exemplary embodiment of this disclosure. The ray-triangle test unit is configured to receive ray and triangle information and determine whether the ray intersects the triangles. The ray-triangle test unit includes hardware configured to decrease the time it takes for determining ray intersection for a pair of triangles sharing an edge. In an exemplary non-limiting embodiment, the ray-triangle test and transform block 720 shown in FIG. 7 may comprise the components illustrated in FIG. 10. In an exemplary non-limiting embodiment, the ray-triangle test and transform block 720 may include a single ray-triangle test unit or a plurality of ray-triangle test units.

The ray-triangle test unit includes a transform and project circuit 1150, a triangle winding test block 1160, and a distance test block 1170. The ray-triangle test and transform block 720 data pipe operates on the ray by the ray projection and transformation circuitry 1152, the vertices by the vertex projection and transformation circuitry 1154*a*-154*d*, the edges by the edge test circuitry 1156*a*-1156*e*, and then the triangle by the triangle winding test block 1160. Examples of the present technology, expand the data pipe to add support for a single additional vertex, an additional edge, and an additional triangle. As shown in FIG. 10, support for handling the additional triangle can be achieved by including an additional vertex projection and transform circuitry 1154*d* and edge test circuitry 1156*d*-1156*e*.

The transform and project circuit 1150 receives ray and triangle information and applies geometric transforms and/or projections to the ray and/or the triangle. The transforms and/or projections simplify the intersection test from a 3D space to a 2D space.

The transform and project circuit 1150 may receive information for a single triangle or two triangles sharing an edge. When information for a single triangle is received, the transform and project circuit 1150 determines barycentric coordinates of the ray based on the transformed triangle vertices v0, v1 and v2.

When information for two triangles sharing an edge is received, the transform and project circuit 1150 performs the same operations described above for the three triangle vertices v0, v1 and v2 associated with the first triangle, and further determines barycentric coordinates of the ray relative to the second triangle using the results of the calculations related to the first triangle and also for the second triangle based on the additional triangle vertex v3 along with the first triangle's calculations relating to shared vertices v0 and v1. In one embodiment, the transform and project circuit 1150 allows for the ray intersection test for the second triangle to be performed in parallel to the ray intersection test for the first triangle, but without needing to double the hardware to perform the intersection test.

The transform and project circuit 1150 includes ray projection/transformation circuitry 1152 configured to define a coordinate space relative to the ray and apply transformation to the ray (e.g., ray origin and ray direction). Vertex projection and transform circuitry 1154*a*-1154*c* is configured to transform (project) the three triangle vertices v0, v1 and v2 relative to the transformed ray. The edge test circuitry 1156*a*-1156*c* is configured to determine unnormalized barycentric coordinates of the ray based on the transformed (projected) triangle vertices v0, v1 and v2 of the first triangle.

As shown in FIG. 10, to further perform the ray triangle intersection test for a second triangle sharing an edge with the first triangle, circuitry for all three vertices of the second triangle does not need to be duplicated. The computations for the second triangle may be performed by merely adding vertex projection and transform circuitry 1154*d* and edge test circuitry 1156*d*-1156*e*. The vertex projection and transform circuitry 1154*d* is configured to transform (project) the additional vertex v3 of the second triangle relative to the transformed ray. The edge test circuitry 1156*d*-1156*e* is configured to determine unnormalized barycentric coordinates of the ray based on the transformed (projected) triangle vertices v0, v1 and v3 of the second triangle.

In one example, the barycentric coordinates for the second triangle can be provided by using the results of the edge 1 test circuitry 1156*a* (for the first triangle), the results of the edge 4 test circuit 1156*d* (for the second triangle) and the results of the edge 5 test circuit 1156*e* (for the second triangle). The edge 4 test circuit 1156*d* may use the results of transform circuitry 1154*a* (for the first triangle) and the edge 5 test circuit 1156*e* may use the results of transform circuitry 1154*b* (for the first triangle). Accordingly, the vertex v0 and v1 transformations and the edge 1 results can be used for the second triangle without having to repeat the associated operations.

As is well known, the barycentric coordinates express the position of the transformed ray on the triangle with three scalars. The location of this point includes position inside or outside of the triangle, position on any of the three edges of the triangle, or any one of the three triangle's vertices. Examples of how ray intersection on edges or vertices can be handled are described in co-pending U.S. application Ser. No. 16/101,148 entitled "Conservative Watertight Ray Triangle Intersection", which is hereby incorporated by reference in its entirety.

The triangle winding test block 1160 may be configured to determine whether the ray intersection is inside or outside of the respective triangle and determine a vertex-winding order of the vertices for each triangle determined to be intersected by the ray. The vertex-winding order may indicate whether the triangle is being seen from the "front" or the "back" side and whether the triangle should be returned as an intersected triangle. In some examples, the ray triangle intersection query may return each intersected triangle regardless of the vertex winding order. The triangle winding test block 1160 may include first winding circuitry configured to determine vertex-winding order for the first triangle and second winding circuitry configured to determine vertex-winding order for the second triangle in parallel.

The distance test block 1170 is configured to determine the parametric length of the point of intersection (e.g., if the ray intersection has the desired facing). In the case of a single triangle intersection or two triangle intersections, processing of that triangle or triangles will go down the distance test pipe to check against the parametric coordinate along the length of the ray (t-range). In an embodiment, the distance test only processes single triangle at a time. If both triangles in a pair hit, which is uncommon, they will go down the distance pipe back-to-back at the original rate of one per cycle. This reduced rate is optional. In one embodiment, more substrate area and associated circuit complexity is used to add a second distance test pipe to support hitting at a double rate. But since a double hit is uncommon, in some embodiments the performance increase is not worth the area. As it is, the ray-triangle test and transform block 720 sustains a per cycle rate of either cull 2 triangles, cull 1 triangle and hit 1 triangle, or hit 1 triangle.

In one embodiment, the Intersection Management Unit 722 processing rate may still remain unchanged since ray-triangle test and transform block 720 is still only ever providing a single hit per cycle to Intersection Management Unit 722. However, the ray-triangle test and transform block 720 can double the testing rate (e.g. by culling triangle misses) of triangles when triangles are sharing an edge without doubling the circuitry needed to perform the computations. This can provide a significant performance improvement.

In particular, in the case that both triangles are missed by the ray, the update to the Intersection Management Unit 722 will advance the triangle count appropriately to note that two triangles were tested. After advancing the triangle count, the next triangle(s) in the triangle range can be tested for intersection with the ray, without or with another triangle sharing an edge.

The distance test block 1170 may include a buffer to store the transformed triangle information while another triangle is being processed by the distance test block 1170 (e.g., if the determination is made that both of the first triangle and the second triangles are intersected by the ray).

In one embodiment, the vertex projection and transform circuitry 1154*d* may include circuitry (e.g., one or more FADD (a single-precision floating-point addition unit configured to compute "a+b" and round the result to the precision of fp32)) configured to express the fourth triangle vertex relative to the ray origin in the vertex section, circuitry configured to permute the vertex components based on shear direction, and/or circuitry (e.g., one or more fused multiply add units) to apply a shear transform. In one embodiment, in the triangle section, the triangle winding test block 1160 may include a CCW (counter-clockwise) circuit and CW (clockwise) circuit for each triangle to determine whether there is a hit based on the calculated barycentrics by the edge test circuitry and the winding of the triangle.

Example Ray Triangle Traversal Implementation

Figure 11:
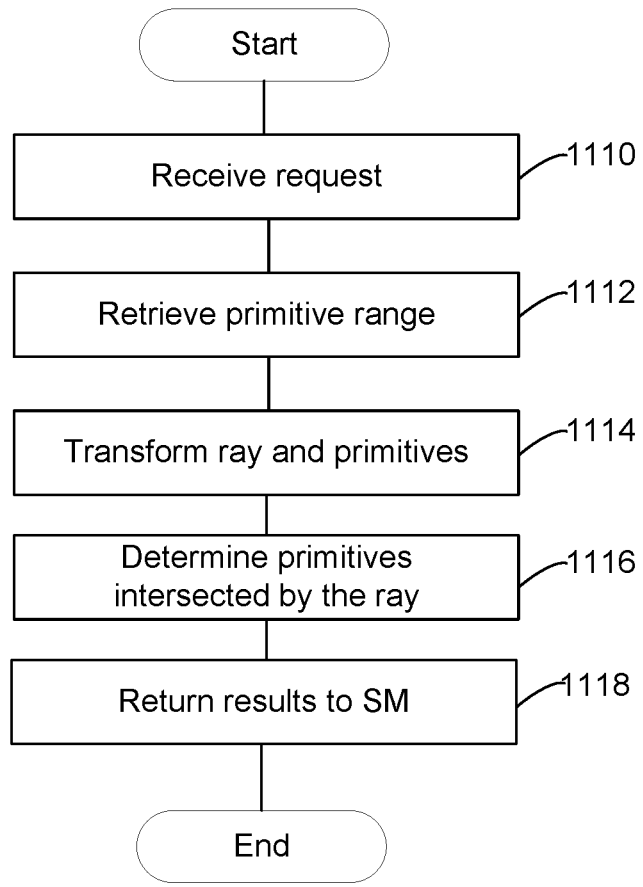
FIGS. 11 and 12 are flowcharts of example TTU processes.

FIG. 11 illustrates a flowchart of an example non-limiting method for determining ray-primitives intersections. One or more operations discussed with reference to FIG. 11 may be performed by a TTU 138 or a ray-triangle test and transform block 720 disclosed in this application, but the example implementations are not so limited.

The method includes receiving a request for one or more intersections between a query data structure and a primitive range (step 1110). The request may be received from an SM 132 or may be the result of ray-complet test performed by the ray-complet test path of the TTU 138. The request may request a nearest intersection or each intersection in the primitive range. In some embodiments, the query data structure may be a ray given by its three-coordinate origin, three-coordinate direction, and minimum and maximum values (tmin, tmax) for the parametric interval (t-parameter) along the ray (e.g., representing the segment of current interest along the ray). The primitive range for the request may be identified in one or more stack entries of a stack management block in the TTU 138. The stack entries may be made based on results of finding intersected leaf nodes of a BVH in the ray-complet test path of the TTU 138.

The primitive range is retrieved from memory (step 1112). The primitive range may be retrieved from the TTU memory (e.g., triangle cache 754 of L0 cache 750) or memory outside of the TTU 138. The primitive range may, for example, be provided in a contiguous group of cacheline-sized blocks. Each cacheline-sized block may include a header identifying the type of geometry expressed within the block and a primitive type of each primitive in the block. For example, the header may identify that the block includes triangles and may indicate whether each triangle is an alpha primitive or an opaque primitive. The header may include an alpha bit for each primitive to designate whether the respective primitive is an alpha primitive or an opaque primitive.

The method includes transforming the ray and/or the primitives (step 1114). The ray and/or primitives are transformed to simplify the 3D intersection problem and decrease the floating point resources needed in the TTU hardware to perform the intersection test. In one example, the transformation may include translation, shear, and/or scale transformations from world space to ray-coordinate space. In the ray-coordinate space the ray may start at the origin and extend (e.g., with unit length) along one coordinate axis. In some implementations, the TTU hardware applies an affine primitive transformation to the ray so that the primitive is a unit primitive with edge points at (1, 0, 0), (0, 1, 0) and (0, 0, 0). In some examples, the transformation of the primitives may be performed for a plurality of primitives (e.g., primitives sharing a vertex) in parallel.

Using the transformed ray and/or primitives, a determination is made as to which primitives are intersected by the ray (step 1116). The transformations applied to the ray and primitive simplify the intersection problem from 3D space to 2D space with simplified planar coordinates (e.g., 2D ray-relative coordinates). In the 2D space, the intersection test becomes determining if the ray intersection is inside edges of the primitive (e.g., triangle edges).

Each primitive in the primitive range may be tested for intersection with the ray. In one example, hardware circuitry may be configured to return a single ray intersection result (e.g., a hit) each cycle. In other examples, hardware circuitry may be configured to test a plurality of primitives sharing one or more vertices for intersection with the ray each cycle. A pair of triangles that share a common edge can be processed in one cycle based on four unique vertices defining the pair of triangles sharing a common edge.

For a triangle, the intersection determination can be computed using three 2D edge tests which indicate whether the ray passes on one side of the edge (represented with a positive value), an opposite side of the edge (represented by a negative value), or intersects an edge (represented by zero). The signs of the three 2D edge tests are inspected to determine if the ray intersects or misses the triangle. In one non-limiting example, if all of the signs are positive or all of the signs are negative then the triangle is intersected by the ray. If one of the signs does not match the other two signs, then the ray is outside of the triangle. If the result produces one or more zeros then the intersection may be on an edge or a vertex. In one example embodiment, if the result of the 2D edge test includes a single zero then the determination is made that the intersection may be on an edge; if the result of the 2D edge test includes two or more zeros then the determination is made that the intersection may be on a vertex. Because the edge or vertex may be shared by other triangles, tie breaking rules implemented, for example, in TTU logic, may be used to ensure that a single intersection is returned. Examples of TTU logic providing tie breaking rules are described in co-pending U.S. application Ser. No. 16/101,148 entitled "Conservative Watertight Ray Triangle Intersection", which is hereby incorporated by reference in its entirety. Other sign conventions can also be adopted to determine intersections.

Intersection results may be inaccurately determined at or near an edge or vertex of a triangle because small results are often computed at these locations and rounding in floating point arithmetic operations can produce insufficient precision to make accurate spatial determinations. For example, computations for a ray intersection near an edge or vertex will produce a small positive or negative value, which may get rounded to zero during the computations by the limited precision computation hardware. To address this issue, example non-limiting embodiments use fused floating point operation units configured to combine multiple floating-point arithmetic operations to efficiently achieve higher numerical precision. The fused floating point operation units may be implemented in hardware included in the TTU and in some example embodiments, in the Ray Triangle Test (RTT) block of the TTU (see e.g., block 720 in FIG. 7).

Fused floating point operation units reduce latency and improve accuracy due to fewer rounding steps. Some exemplary non-limiting embodiments use fused floating point operation units with expanded exponent range to guarantee that there is no underflow or overflow in the floating point exponents. The fused floating point operation unit allows for more precise ray-triangle results because the sign of the results is used to determine if the triangle is hit or not and the fused floating point operation unit ensures that the sign of the results is correct even though the values may get rounded.

If the TTU determines an intersection, then it can also determine the coordinates of the intersection. The intersection coordinates may be provided for example by barycentric coordinates for further processing (e.g., computation of texture coordinates) by the SM 132 or in some other (e.g., future) implementations by hardware within the TTU.

Intersection information for primitives determined to be intersected by the ray is returned to the SM 132 (step 1118). In one example, the TTU 138 returns a closest hit primitive to the SM 132. In one exemplary embodiment, the results returned to the SM 132 may include, for each intersected primitive, a parametric length which specifies the point along the ray where the hit occurred and attributes of the hit such as the instance ID, material ID, or which can be used by the SM to select a specific material shader and a set of resource bindings, and primitive IDs and (u,v) coordinates which can be used by the SM 132 during shading to retrieve and interpolate attributes or sample textures.

The TTU 138 may return results to the SM 132 when a request completes or mid-traversal if the need should arise for SM intervention (for example, if the number of alpha hits found within a single triangle range exceeds the storage capacity for alpha hits in the result queue). If all of the primitives in the request are opaque, then the TTU 138 can return only the closest opaque primitive to the SM 132. However, if the primitives include a mixture of opaque and alpha primitives, a plurality of alpha primitives may be intersected by the ray. Each of the intersected alpha primitives may be returned to the SM 132 for further processing (e.g., to determine if there is a hit based on texture information associated with the alpha primitive). The SM 132 may use the results to build the scene, issue additional queries to the TTU 138, and/or modify previously issued queries to the TTU.

Figure 12:
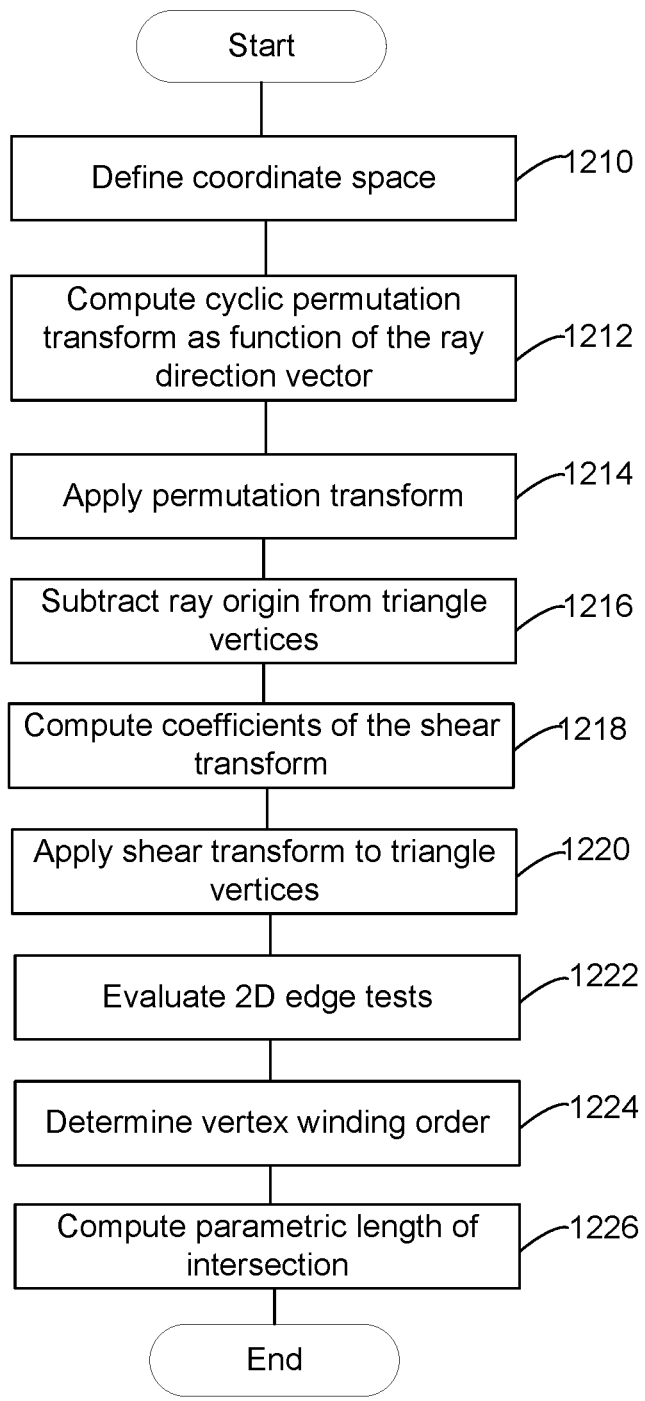

FIG. 12 shows an example non-limiting process for determining intersections between a ray and one or more triangles. While the steps in FIG. 12 are described with reference to specific numerical operations for determining an intersection, the embodiments of this disclosure are not limited to the disclosed numerical operations.

The TTU performs a ray/triangle intersection test to determine whether a ray intersects a triangle and provides an intersection location if an intersection is determined. The ray R(t) with origin P and direction D can be defined as R(t)=P+tD and the first triangle can be defined by its three vertices v0, v1, and v2, and the second triangle can be defined by three vertices v0, v1, and v3 (see FIGS. 9A-9C). In the case that a single triangle is being processed, only vertices v0, v1, and v2 may be considered.

To simplify the intersection problem, geometric translations are applied to the ray and/or the triangle. First, a new coordinate space is defined 1210 to simplify the calculations. In one example, the coordinate space is defined relative to the ray where the ray origin becomes the coordinate space origin at (0, 0, 0), and the major axis of the ray direction vector (the coordinate with the largest absolute value) becomes the normalized Z-axis (0, 0, 1) of the coordinate space. The ray may be defined in ray-relative coordinates by simplified ray R' with origin P'=(0, 0, 0) and direction D'=(0, 0, 1).

A permutation transform may be computed as a function of the ray direction vector 1212, which includes computing the largest-magnitude component of the ray direction vector (X, Y, or Z) and swapping that component with the Z-component. If the permuted Z-component is negative, the permuted X-axis and Y-axis components are swapped. The permutation transform is applied to ray origin, ray direction, and/or triangle vertices 1214, and the ray origin is subtracted from all triangle vertices 1216. The triangle vertices may include three vertices if a single triangle is being is being tested for intersection with the ray or four vertices if a pair of triangles sharing an edge are being tested for intersection with the ray. Subtracting the ray origin transforms the ray and the triangles so that ray origin is at the 3D coordinate system origin.

The coefficients of the shear transform are computed 1218, which take the x and y component of the ray direction vector to zero. The shear transform is applied to the triangle vertices 1220 (e.g., the three vertices for a single triangle or four vertices for a triangle pair). The pre-calculated transformation may be provided by:

$$M = \begin{pmatrix} 1 & 0 & -D_x/D_z \\ 0 & 1 & -D_y/D_z \\ 0 & 0 & 1/D_z \end{pmatrix}.$$

The transformed triangle vertices may be provided by:

$v0'=M(v0-P),$ $v1'=M(v1-P),$ $v2'=M(v2-P).$ $v3'=M(v3-P).$

In some embodiments, the transformation may be pre-determined by the TTU and applied to the triangle vertices by the Ray Triangle Test (RTT) block.

The 2D edge test is evaluated by computing the barycentric coordinates 1222 of the sheared 2D triangle at (x=0, y=0). Barycentric coordinates can be used to express the position of any point located on the triangle with three scalars. The location of this point includes any position inside the triangle, any position on any of the three edges of the triangles, or any one of the three triangle's vertices themselves.

A vertex-winding order is determined 1224 by inspecting the signs of the barycentric coordinates and applying a backface culling test. If the point at (x=0, y=0) is inside of all three edges and has the desired facing, the parametric length of the point of intersection is calculated 1226. The parametric length of the intersection point may be calculated by interpolation of the vertex z-components.

The barycentric coordinates for a first triangle can be provided by:

$U1=D' \cdot (v2' \times v1'),$ $V1=D' \cdot (v0' \times v2'),$ $W1=D' \cdot (v1' \times v0').$ The barycentric coordinates for a second triangle can be provided by:

$U2=D' \cdot (v3' \times v1'),$ $V2=D' \cdot (v0' \times v3'),$ $W2=D' \cdot (v1' \times v0').$ The barycentric coordinates can be further simplified due to unit ray intersection with direction D'=(0, 0, 1). The simplified barycentric coordinates provide three 2D edge tests for the first triangle can be provided by:

$U1=v2_x' v1_y' - v1_x' v2_y',$ $V1=v0_x' v2_y' - v2_x' v0_y',$ $W1=v1_x' v0_y' - v0_x' v1_x',$

The simplified barycentric coordinates provide three 2D edge tests for the second triangle can be provided by:

$U2=v3_x' v1_y' - v1_x' v3_y',$ $V2=v0_x' v3_y' - v3_x' v0_y',$ $W2=v1_x' v0_y' - v0_x' v1_y'.$

As can be seen from above, the transformed vertices that are shared by the two triangles are obtained by the same equations and the coordinates for the W1 and W2 are obtained by the same equations. Accordingly, the results for these operations performed for the first triangle can be used in the second triangle, without having to repeat these operations using the same or different hardware.

The signs of the three 2D edge tests may be inspected to determine if the ray intersects or misses the triangle. The signs of the three 2D edge tests are tested separately for each triangle. In one example, if all of the signs are positive or all of the signs are negative, then the triangle is intersected by the ray. If one of the signs does not match the other two signs, then the intersection is outside of the triangle. If the result produced one or more zeros, then the intersection may be on an edge or a vertex of the triangle. Because the edge or vertex may be shared by other triangles, tie breaking rules may be needed to ensure that only a single intersection is returned when the intersection is determined to be on an edge or a vertex.

In example non-limiting embodiments, the edge tests may operate on unnormalized barycentric coordinates instead of normalized barycentrics and may be computed using fused floating point operation units (e.g., fused 2-component dot product units—fused DP2 units) with expanded 10-bit exponent range to ensure that exponent underflow cannot cause the edge test to produce a denormalized or zero result. In some example embodiments, the edge test may operate on normalized barycentrics.

Using the DP2 unit may avoid loss of precision because instead of performing individual operations which may each include their own precision loss (e.g., due to rounding), the DP2 unit allows for executing of an entire expression (e.g., of the unnormalized barycentric coordinates) in one fused floating point operation. The intermediate results can be considered with full precision and the rounding would only happen at the very end so that the sign will always be correct.

Identifying Triangles Sharing an Edge

The TTU 138 may be configured to identify triangles sharing an edge. In some examples, the triangles sharing an edge may be identified by the ray-triangle test and transform block 720.

Based on the ray triangle intersection query, the TTU 138 receives one or more compressed triangle blocks (e.g., cacheline blocks) including information about a triangle range to be tested for intersection with the ray. The compressed triangle block may include a vertex index corresponding to vertices of triangles identified in the compressed triangle block.

The TTU 138 may use the existing encoding for compressed triangle blocks, keying off the vertex indexing to identify those triangles that share two vertices and thus a common edge. The determination of triangles sharing two vertices may be made only for triangles in a single compressed triangle block, for triangles in a plurality of compressed triangle blocks, for each triangle in a triangle range identified in the query, or the triangle range spanning over a plurality of compressed triangle blocks.

In some examples, the determination of whether a triangle shares an edge with another triangle may be made only between a target triangle and a predetermined number of subsequent triangles in the triangle range. In one example, the predetermined number of subsequent triangles may be a single triangle. When presented with a ray-triangle intersection test operation on a compressed triangle range, the ray-triangle test and transform block 720 will decode both the target triangle and the next triangle if possible. If both triangles share an edge, the ray-triangle test and transform block 720 tests both triangles in parallel by passing the four unique vertices into the data pipe. If the triangles do not share an edge, the ray-triangle test and transform block 720 may test the target triangle by passing the three vertices of the target triangle into the data pipe, followed by testing the next triangle by passing the three vertices of the next triangle into the data pipe in a subsequent cycle.

A shared edge can be any combination of the three edges for each triangle. When compressed triangle ranges use vertex indexing, shared edges can be determined by comparing the vertex indexes between triangles. Uncompressed triangle encodings that don't use vertex indexing can also find pairs by comparing the actual vertex value. Additional area may be needed for processing logic for comparing actual vertex value to identify a shared edge.

In some examples, the compressed triangle block may identify which triangles share a vertex or a pair of vertices. The BVH builder may group and identify triangles sharing a vertex or a pair of vertices in the compressed triangle block. For example, a flag may be set (e.g., by a bit) for a triangle if a subsequent triangle in a range has a common vertex or pair of vertices.

BVH Builder Changes

According to examples of the present technology, the BVH builder may be configured to adjust triangle block formation to increase the occurrence of triangle pairs. Generally the BVH builder may be configured to form blocks in the most compact format. This could split two triangles that might otherwise pair into different cacheline blocks which would not be able to take advantage of triangle pairing in RTT. Based on the capability of the hardware (i.e., the ray-triangle test and transform block 720) being able to accelerate ray-triangle testing when triangles share an edge, the BVH builder may group two or more triangle sharing an edge into the same cacheline block.

While making changes to the BVH builder may increase the number of triangles sharing an edge in the cacheline blocks, the change to the BVH builder is not needed to take advantage of the feature, because existing construction naturally creates the necessary conditions. While there is a performance benefit from increased triangle pairing, such an adjustment would likely also increase the number of triangle blocks which increases memory footprint and could reduce performance due to increased memory bandwidth cost.

Example of Pairing and Winding Mechanics

As shown in FIG. 10, different data lanes are provided for the vertices of the first and second triangles to be provided. The processing circuitry in each of the data paths can be configured to handle a pair of triangles that are arranged with respect to each other in a specific manner. If the triangles being tested are arranged in a different configuration, the result of the processing circuitry will need to take account for these differences by realigning the data.

Figure 13:
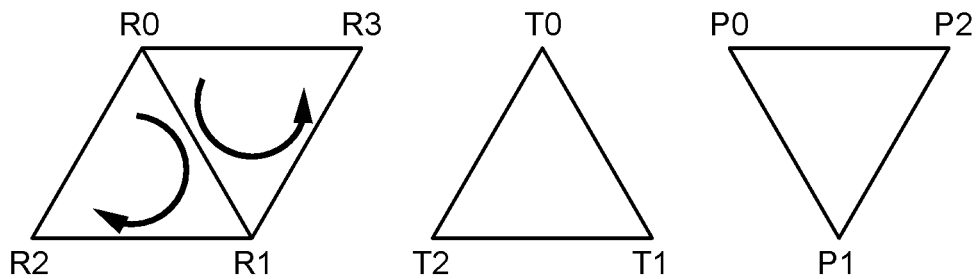
FIG. 13 illustrates a configuration for a triangle pair sharing an edge.

FIG. 13 shows an example of how a pair of triangles sharing an edge may be arranged for a particular hardware. Triangles that pair will share an edge provided by vertices R0 and R1. As shown in FIG. 13, vertices in the paired diagram, R0, R1, R2, and R3, match to the corresponding vertex lanes in the transform and project circuit 1150 of the ray-triangle test and transform block 720 (e.g., R0 in lane 0, R1 in lane 1, etc.). The components of the transform and project circuit 1150 may be configured to process triangles based on the vertices arrangement and winding shown in FIG. 13. The triangles that are paired are from arbitrary triangles T with vertices (T0, T1, T2) and P with vertices (P0, P1, P2), where again the numeral for the vertex maps to the RTT vertex lane that vertex would have gone down if there were not triangle pairing.

Comparing vertex indices, a determination can be made as to which of vertices (T0, T1, T2) match with which of vertices (P0, P1, P2). If there are two shared and two unique points, then pairing can happen. If either triangle has vertex indices that are not unique among themselves, no pairing is done. E.g., if P0==P1, then no pairing.

Figure 14:
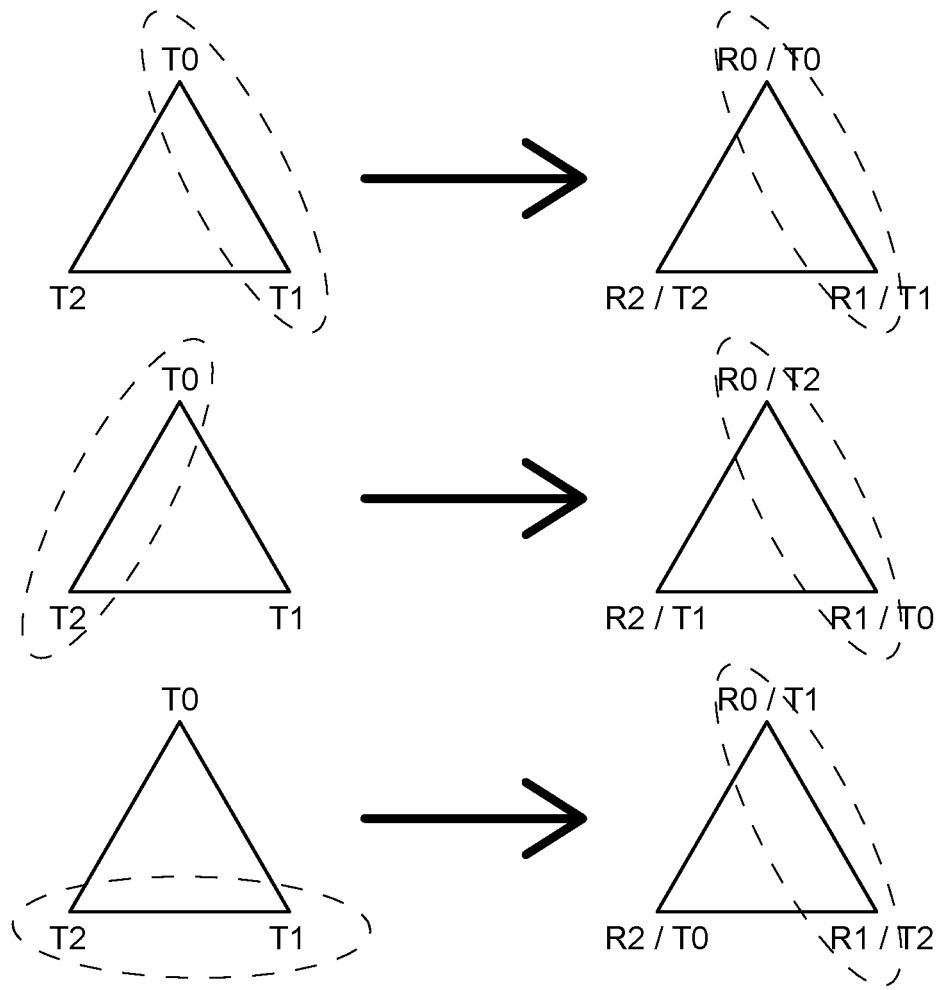
FIG. 14 illustrates conceptual rotation and mapping of a first triangle to lanes in a ray-triangle intersection unit according to an embodiment of this disclosure.

Among the vertices for triangle T, there are three options for a shared edge: T0-T1, T0-T2, or T1-T2. That can also be expressed as the unique vertex: T0, T1, or T2. The diagrams in FIG. 14 show the conceptual rotation and mapping to RTT lanes that must happen when each is selected. FIG. 16 shows pseudo-math describing the mapping between vertices R0, R1 and R2, and vertices T0, T1 and T2.

Once the unique vertices are known and the mapping for triangle T takes place, the fourth vertex lane must be for the unique vertex from triangle P. But the winding of triangle P may be inverted from the diagram in FIG. 14 in some cases.

Figure 15:
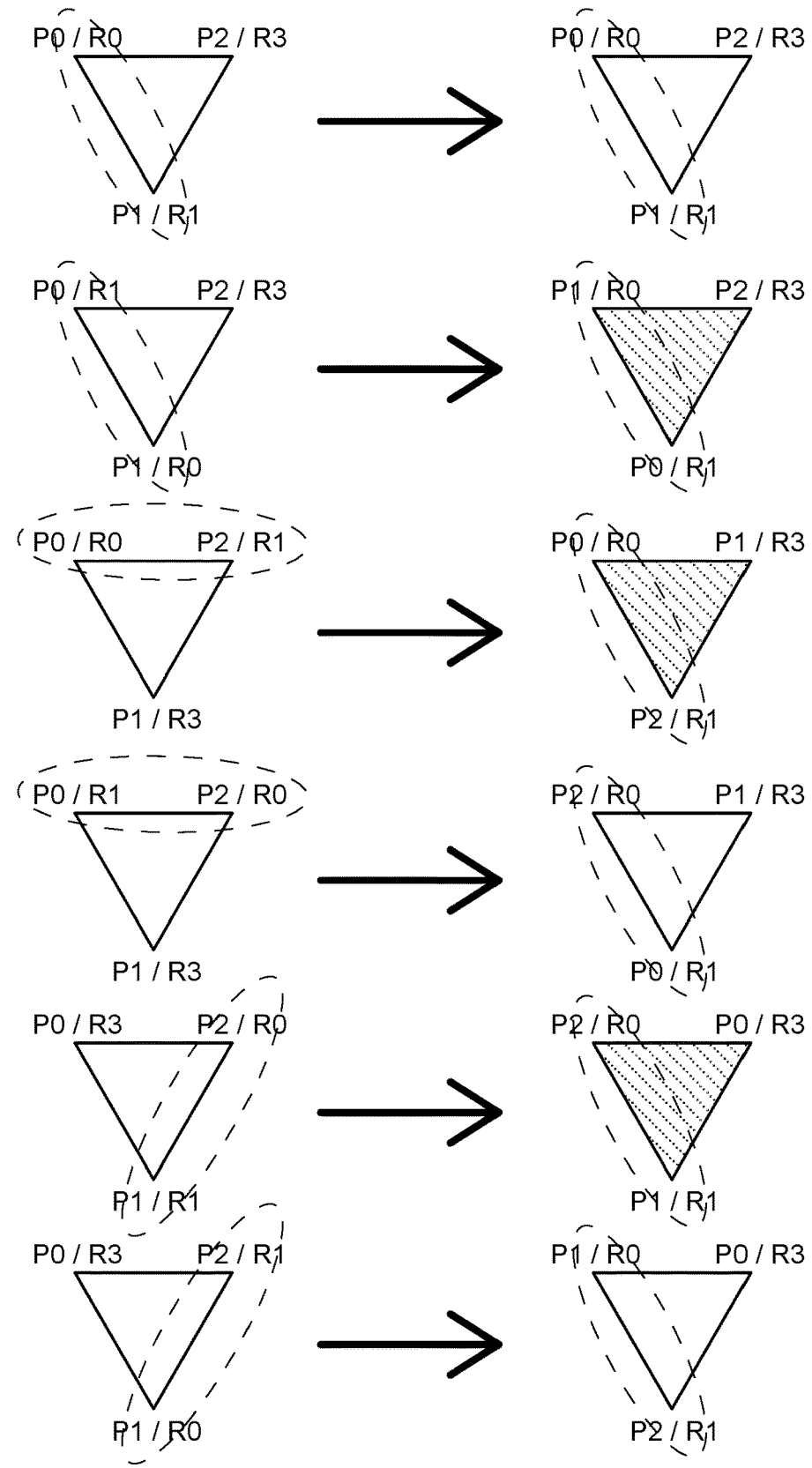
FIG. 15 illustrates conceptual rotation and mapping of a second triangle to lanes in a ray-triangle intersection unit according to an embodiment of this disclosure.

For Triangle P, there are again three options for a unique vertex, but once that is chosen, there are two options for mapping the other vertices to either R0 or R1. By mapping to R0 or R1, here instead of vertices in T, we can reduce the combinatorial explosion. This gives six options shown in FIG. 13. The triangles in FIG. 15 including dotted parallel lines denote that the triangle must be flipped to match up correctly, which means that the result winding, clockwise (CW) or counterclockwise (CCW), from the intersection must be flipped. FIG. 17 shows pseudo-math describing the mapping between vertices R0, R1 and R3, and vertices T0, T1 and T2.

Expanding to Other Shared Features and Primitives

Examples of the present technology have been described with reference to performing ray triangle intersection test for a pair of triangles sharing an edge (e.g., two vertices), but are not so limited. Examples of the present technology can be applied to more than two triangles sharing at least one vertex. In some examples, the present technology can be expanded to perform ray intersection related computations for a plurality of triangles (e.g., three triangles) each triangle sharing at least one vertex or edge with one other triangle of the plurality of triangles but not another triangle in the plurality of triangles. For example, the intersection hardware can be configured to process a strip of triangles with a shared edges in between or a fan of triangles sharing a common vertex (see e.g., fan of triangles A-E in FIG. 1C sharing a single vertex and each triangle in the fan of triangles sharing an edge with another triangle).

The present technology can also be applied to a TTU configured to perform ray intersection test on other primitives, such as convex polygons, quads, lines, rectangles, quadrics, patches, or other geometric primitives known to those familiar with the state of the art, sharing a vertex or an edge. Similar to the examples provided above, the TTU may be configured to include additional hardware to process the additional primitives in parallel with the primary primitive but without the additional hardware needing to include all of the components used to process the primary primitive. At least a portion of processing results from the hardware processing the primary primitive can be combined with the processing results of the additional hardware to determine whether the additional primitive is intersected by the ray.

Extension to Support Other Vertex Related Operations

Embodiments of this disclosure can be used to performing other vertex related operations for primitives sharing one or more vertices or one or more edges. For example, the primitive processing circuitry shown in FIG. 8 or other circuits in or outside of the ray-primitive test block 720 may use the results performed for a first primitive in operations for one or more other primitives sharing the one or more vertices or edges with the first primitive.

In some examples, the ray-primitive test block 720 may further support hardware-accelerated motion blur through hardware-based interpolation. Examples of accelerate motion blur are described in co-pending and concurrently filed U.S. application Ser. No. 16/901,847 entitled "Ray Tracing Hardware Acceleration for Supporting Motion Blur and Moving/Deforming Geometry", which is hereby incorporated by reference in its entirety. The ray-primitive test block 720 may include circuitry configured to perform hardware-based interpolation in parallel for vertices of a first primitive and one or more additional premieres sharing a vertex or an edge with the first primitive. In this example, hardware circuitry for the one or more additional primitives does not need to include circuitry to perform interpolation for each shared vertex or edge, but can use interpolation results from the first primitive. This embodiment avoids the redundant computation for the same one or more shared vertices or edges. In the example with two triangles sharing an edge, the redundant motion interpolation for vertices of the shared triangles can be avoided in the second triangle of the pair.

Example Instancing Pipeline Implementation by TTU 138 and SM 132

For sake of completeness, the following describes how TTU 138 in example embodiments performs instancing and associated transforms.

Figure 18A:
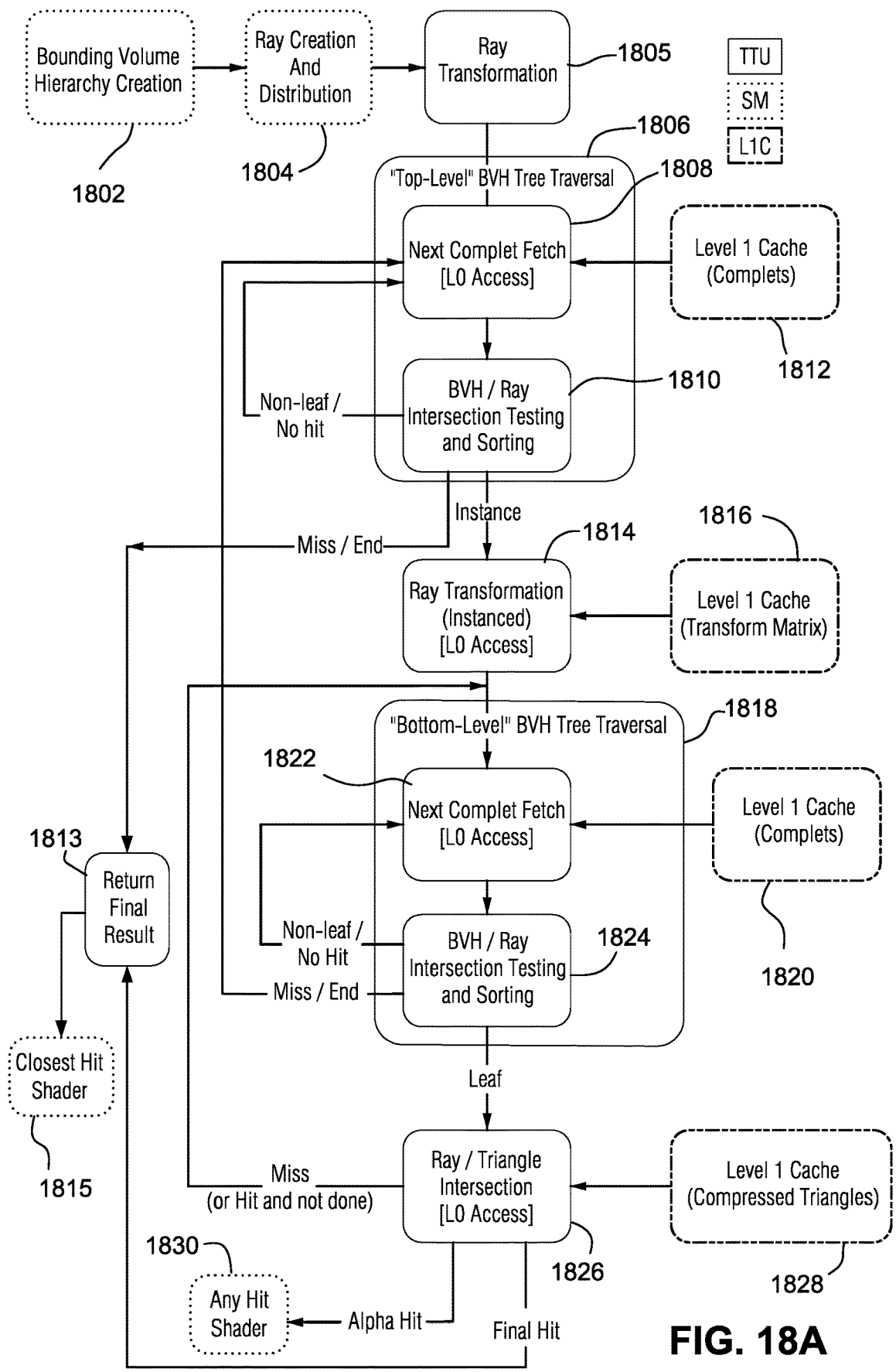
FIGS. 18A and 18B illustrate more detailed ray tracing pipelines.

The FIG. 18A more detailed diagram of a ray-tracing pipeline flowchart shows the data flow and interaction between components for a representative use case: tracing rays against a scene containing geometric primitives, with instance transformations handled in hardware. In one example non-limiting embodiment, the ray-tracing pipeline of FIG. 18A is essentially software-defined (which in example embodiments means it is determined by the SMs 132) but makes extensive use of hardware acceleration by TTU 138. Key components include the SM 132 (and the rest of the compute pipeline), the TTU 138 (which serves as a coprocessor to SM), and the L1 cache and downstream memory system, from which the TTU fetches BVH and triangle data.

The pipeline shown in FIG. 18A shows that bounding volume hierarchy creation 1802 can be performed ahead of time by a development system. It also shows that ray creation and distribution 1804 are performed or controlled by the SM 132 or other software in the example embodiment, as shading (which can include lighting and texturing). The example pipeline includes a "top level" BVH tree traversal 1806, ray transformation 1814, "bottom level" BVH tree traversal 1818, and a ray/triangle (or other primitive) intersection 1826 that are each performed by the TTU 138. These do not have to be performed in the order shown, as handshaking between the TTU 138 and the SM 132 determines what the TTU 138 does and in what order.

The SM 132 presents one or more rays to the TTU 138 at a time. Each ray the SM 132 presents to the TTU 138 for traversal may include the ray's geometric parameters, traversal state, and the ray's ray flags, mode flags and ray operations information. In an example embodiment, a ray operation (RayOp) provides or comprises an auxiliary arithmetic and/or logical test to suppress, override, and/or allow storage of an intersection. The traversal stack may also be used by the SM 132 to communicate certain state information to the TTU 138 for use in the traversal. A new ray query may be started with an explicit traversal stack. For some queries, however, a small number of stack initializers may be provided for beginning the new query of a given type, such as, for example: traversal starting from a complet; intersection of a ray with a range of triangles; intersection of a ray with a range of triangles, followed by traversal starting from a complet; vertex fetch from a triangle buffer for a given triangle, etc. In some embodiments, using stack initializers instead of explicit stack initialization improves performance because stack initializers require fewer streaming processor registers and reduce the number of parameters that need to be transmitted from the streaming processor to the TTU.

In the example embodiment, a set of mode flags the SM 132 presents with each query (e.g., ray) may at least partly control how the TTU 138 will process the query when the query intersects the bounding volume of a specific type or intersects a primitive of a specific primitive type. The mode flags the SM 132 provides to the TTU 138 enable the ability by the SM and/or the application to e.g., through a RayOp, specify an auxiliary arithmetic or logical test to suppress, override, or allow storage of an intersection. The mode flags may for example enable traversal behavior to be changed in accordance with such aspects as, for example, a depth (or distance) associated with each bounding volume and/or primitive, size of a bounding volume or primitive in relation to a distance from the origin or the ray, particular instances of an object, etc. This capability can be used by applications to dynamically and/or selectively enable/disable sets of objects for intersection testing versus specific sets or groups of queries, for example, to allow for different versions of models to be used when application state changes (for example, when doors open or close) or to provide different versions of a model which are selected as a function of the length of the ray to realize a form of geometric level of detail, or to allow specific sets of objects from certain classes of rays to make some layers visible or invisible in specific views.

In addition to the set of mode flags which may be specified separately for the ray-complet intersection and for ray-primitive intersections, the ray data structure may specify other RayOp test related parameters, such as ray flags, ray parameters and a RayOp test. The ray flags can be used by the TTU 138 to control various aspects of traversal behavior, back-face culling, and handling of the various child node types, subject to a pass/fail status of an optional RayOp test. RayOp tests add flexibility to the capabilities of the TTU 138, at the expense of some complexity. The TTU 138 reserves a "ray slot" for each active ray it is processing, and may store the ray flags, mode flags and/or the RayOp information in the corresponding ray slot buffer within the TTU during traversal.

In the example shown in FIG. 18A, the TTU 138 performs a top level tree traversal 1806 and a bottom level tree traversal 1818. In the example embodiment, the two level traversal of the BVH enables fast ray tracing responses to dynamic scene changes.

In some embodiments, upon entry to top level tree traversal, or in the top level tree traversal, an instance node 1805 specifying a top level transform is encountered in the BVH. The instance node 1805 indicates to the TTU that the subtree rooted at the instance node 1805 is aligned to an alternate world space coordinate system for which the transform from the world space is defined in the instance node 1805.

In response to traversing instance node 1805, TTU transforms the ray (or rays) received from the SM from world space to the alternate world space.

Ray transformation 1814 provides the appropriate transition from the top level tree traversal 1806 to the bottom level tree traversal 1818 by transforming the ray, which may be used in the top level traversal in a first coordinate space (e.g., world space), to a different coordinate space (e.g., object space) of the BVH of the bottom level traversal. An example BVH traversal technique using a two level traversal is described in previous literature, see, e.g., Woop, "A Ray Tracing Hardware Architecture for Dynamic Scenes", Universitat des Saarlandes, 2004, but embodiments are not limited thereto.

Example Top Level Tree Traversal

The top level tree traversal 1806 by TTU 138 receives complets from the L1 cache 1812, and provides an instance to the ray transformation 1814 for transformation, or a miss/end output 1813 to the SM 132 for closest hit shader 1815 processing by the SM (this block can also operate recursively based on non-leaf nodes/no hit conditions). In the top level tree traversal 1806, a next complet fetch step 1808 fetches the next complet to be tested for ray intersection in step 1810 from the memory and/or cache hierarchy and ray-bounding volume intersection testing is done on the bounding volumes in the fetched complet.

Figure 18B:
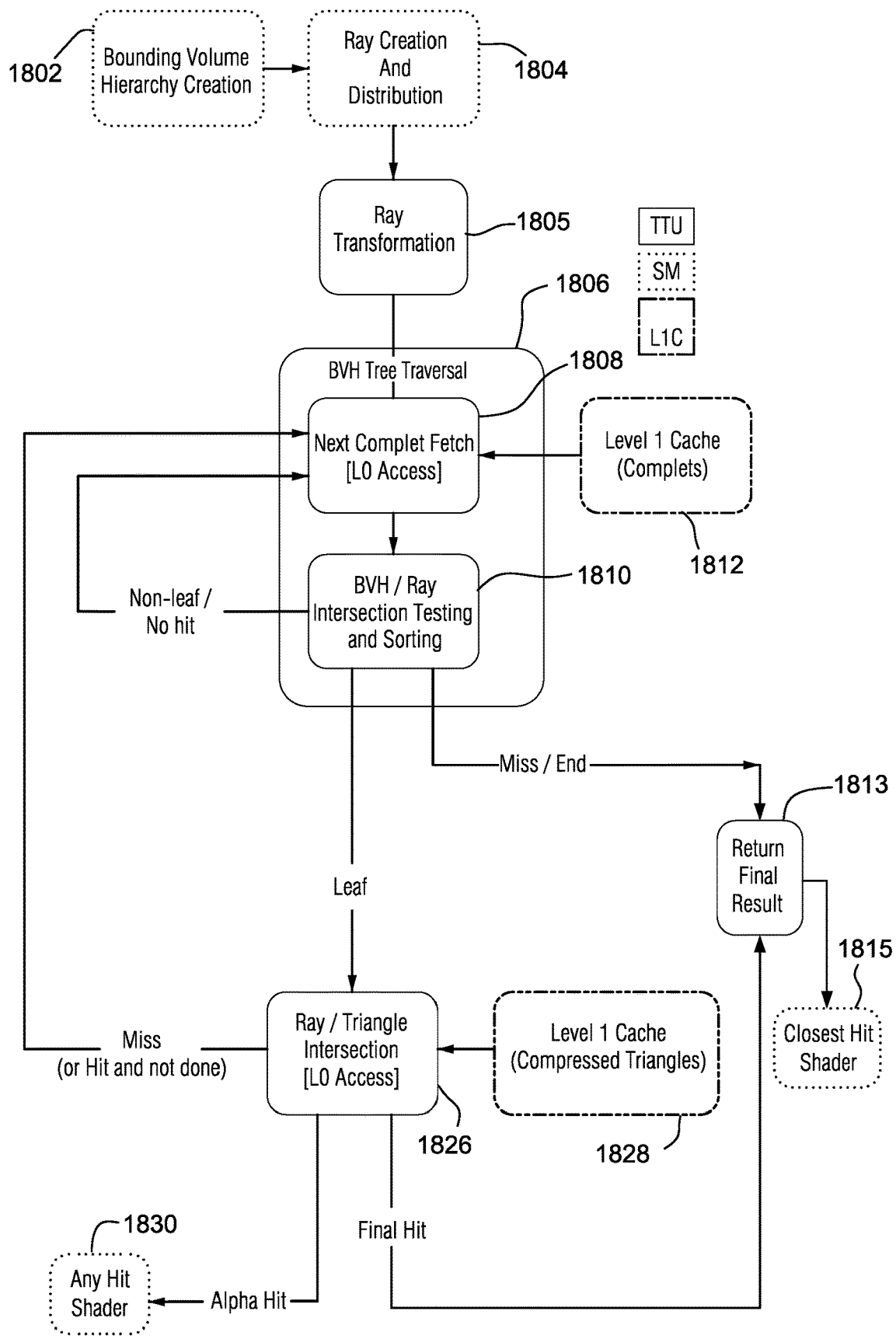

As described above, an instance node connects one BVH to another BVH which is in a different coordinate system. When a child of the intersected bounding volume is an instance node, the ray transformation 1814 is able to retrieve an appropriate transform matrix from the L1 cache 1816. The TTU 138, using the appropriate transform matrix, transforms the ray to the coordinate system of the child BVH. U.S. patent application Ser. No. 14/697,480, which is already incorporated by reference, describes transformation nodes that connect a first set of nodes in a tree to a second set of nodes where the first and second sets of nodes are in different coordinate systems. The instance nodes in example embodiments may be similar to the transformation nodes in U.S. application Ser. No. 14/697,480. In an alternative, non-instancing mode of TTU 138 shown in FIG. 18B, the TTU does not execute a "bottom" level tree traversal 1818 and noninstanced tree BVH traversals are performed by blocks 1808, 1810 e.g., using only one stack. The TTU 138 can switch between the FIG. 18A instanced operations and the FIG. 18B non-instanced operations based on what it reads from the BVH and/or query type. For example, a specific query type may restrict the TTU to use just the non-instanced operations. In such a query, any intersected instance nodes would be returned to the SM.

In some non-limiting embodiments, ray-bounding volume intersection testing in step 1810 is performed on each bounding volume in the fetched complet before the next complet is fetched. Other embodiments may use other techniques, such as, for example, traversing the top level traversal BVH in a depth-first manner. U.S. Pat. No. 9,582,607, already incorporated by reference, describes one or more complet structures and contents that may be used in example embodiments. U.S. Pat. No. 9,582,607 also describes an example traversal of complets.

When a bounding volume is determined to be intersected by the ray, the child bounding volumes (or references to them) of the intersected bounding volume are kept track of for subsequent testing for intersection with the ray and for traversal. In example embodiments, one or more stack data structures is used for keeping track of child bounding volumes to be subsequently tested for intersection with the ray. In some example embodiments, a traversal stack of a small size may be used to keep track of complets to be traversed by operation of the top level tree traversal 1806, and primitives to be tested for intersection, and a larger local stack data structure can be used to keep track of the traversal state in the bottom level tree traversal 1818.

Example Bottom Level Tree Traversal

In the bottom level tree traversal 1818, a next complet fetch step 1822 fetches the next complet to be tested for ray intersection in step 1824 from the memory and/or cache hierarchy 1820 and ray-bounding volume intersection testing is done on the bounding volumes in the fetched complet. The bottom level tree traversal, as noted above, may include complets with bounding volumes in a different coordinate system than the bounding volumes traversed in the upper level tree traversal. The bottom level tree traversal also receives complets from the L1 cache and can operate recursively or iteratively within itself based on non-leaf/no-hit conditions and also with the top level tree traversal 1806 based on miss/end detection. Intersections of the ray with the bounding volumes in the lower level BVH may be determined with the ray transformed to the coordinate system of the lower level complet retrieved. The leaf bounding volumes found to be intersected by the ray in the lower level tree traversal are then provided to the ray/triangle intersection 1826.

The leaf outputs of the bottom level tree traversal 1818 are provided to the ray/triangle intersection 1826 (which has L0 cache access as well as ability to retrieve triangles via the L1 cache 1828). The L0 complet and triangle caches may be small read-only caches internal to the TTU 138. The ray/triangle intersection 1826 may also receive leaf outputs from the top level tree traversal 1806 when certain leaf nodes are reached without traversing an instanced BVH.

After all the primitives in the primitive range have been processed, the Intersection Management Unit inspects the state of the result Queue and crafts packets to send to the Stack Management Unit and/or Ray Management Unit to update the ray's attributes and traversal state, set up the ray's next traversal step, and/or return the ray to the SM 132 (if necessary). If the result queue contains opaque or alpha intersections found during the processing of the primitive range then the Intersection Management Unit signals the parametric length (t) of the nearest opaque intersection in the result queue to the ray management unit to record as the ray's tmax to shorten the ray. To update the traversal state to set up the ray's next traversal step the Intersection Management Unit signals to the Stack Management Unit whether an opaque intersection from the primitive range is present in the resultQueue, whether one or more alpha intersections are present in the result queue, whether the resultQueue is full, whether additional alpha intersections were found in the primitive range that have not been returned to the SM and which are not present in the resultQueue, and the index of the next alpha primitive in the primitive range for the ray to test after the SM consumes the contents of the resultQueue (the index of the next primitive in the range after the alpha primitive with the highest memory-order from the current primitive range in the result queue).

When the Stack Management Unit 740 receives the packet from Intersection Management Unit 722, the Stack Management Unit 740 inspects the packet to determine the next action required to complete the traversal step and start the next one. If the packet from Intersection Management Unit 722 indicates an opaque intersection has been found in the primitive range and the ray mode bits indicate the ray is to finish traversal once any intersection has been found the Stack Management Unit 740 returns the ray and its results queue to the SM with traversal state indicating that traversal is complete (a done flag set and/or an empty top level and bottom level stack). If the packet from Intersection Management Unit 722 indicates that there are opaque or alpha intersection in the result queue and that there are remaining alpha intersections in the primitive range not present in the result queue that were encountered by the ray during the processing of the primitive range that have not already been returned to the SM, the Stack Management Unit 740 returns the ray and the result queue to the SM with traversal state modified to set the cull opaque bit to prevent further processing of opaque primitives in the primitive range and the primitive range starting index advanced to the first alpha primitive after the highest alpha primitive intersection from the primitive range returned to the SM in the ray's result queue. If the packet from Intersection Management Unit 722 indicates that no opaque or alpha intersections were found when the ray processed the primitive range the Stack Management Unit 740 pops the top of stack entry (corresponding to the finished primitive range) off the active traversal stack. If the packet from Stack Management Unit 740 indicates that either there are opaque intersections in the result queue and the ray mode bits do not indicate that the ray is to finish traversal once any intersection has been found and/or there are alpha intersections in the result queue, but there were no remaining alpha intersections found in the primitive range not present in the result queue that have not already been returned to the SM, the Stack Management Unit 740 pops the top of stack entry (corresponding to the finished primitive range) off the active traversal stack and modifies the contents of the result queue to indicate that all intersections present in the result queue come from a primitive range whose processing was completed.

If the active stack is the bottom stack, and the bottom stack is empty the Stack Management Unit 740 sets the active stack to the top stack. If the top stack is the active stack, and the active stack is empty, then the Stack Management Unit 740 returns the ray and its result queue to the SM with traversal state indicating that traversal is complete (a done flag set and/or an empty top level and bottom level stack). If the active stack contains one or more stack entries, then the Stack Management Unit 740 inspects the top stack entry and starts the next traversal step. Testing of primitive and/or primitive ranges for intersections with a ray and returning results to the SM 132 are described in co-pending U.S. application Ser. No. 16/101,148 entitled "Conservative Watertight Ray Triangle Intersection" and U.S. application Ser. No. 16/101,196 entitled "Method for Handling Out-of-Order Opaque and Alpha Ray/Primitive Intersections", which are hereby incorporated by reference in their entireties.

Example Image Generation Pipeline Including Ray Tracing

While the above disclosure is framed in the specific context of computer graphics and visualization, ray tracing and the disclosed TTU could be used for a variety of applications beyond graphics and visualization. Non-limiting examples include sound propagation for realistic sound synthesis, simulation of sonar systems, design of optical elements and systems, particle transport simulation (e.g., for medical physics or experimental high-energy physics), general wave propagation simulation, comparison to LIDAR data for purposes e.g., of robot or vehicle localization, and others. OptiX™ has already been used for some of these application areas in the past.

For example, the ray tracing and other capabilities described above can be used in a variety of ways. For example, in addition to being used to render a scene using ray tracing, they may be implemented in combination with scan conversion techniques such as in the context of scan converting geometric building blocks (i.e., polygon primitives such as triangles) of a 3D model for generating image for display (e.g., on display 150 illustrated in FIG. 4).

Figure 19:
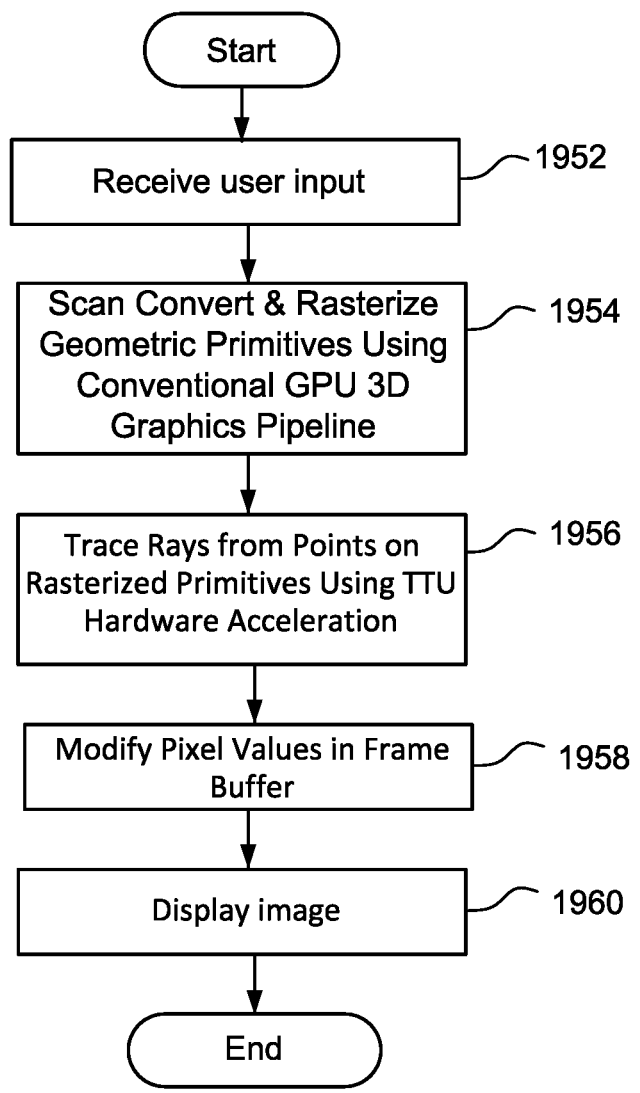
FIG. 19 is a flowchart of an example process to generate an image.

Meanwhile, however, the technology herein provides advantages when used to produce images for virtual reality, augmented reality, mixed reality, video games, motion and still picture generation, and other visualization applications. FIG. 19 illustrates an example flowchart for processing primitives to provide image pixel values of an image, in accordance with an embodiment. As FIG. 19 shows, an image of a 3D model may be generated in response to receiving a user input (Step 1952). The user input may be a request to display an image or image sequence, such as an input operation performed during interaction with an application (e.g., a game application). In response to the user input, the system performs scan conversion and rasterization of 3D model geometric primitives of a scene using conventional GPU 3D graphics pipeline (Step 1954). The scan conversion and rasterization of geometric primitives may include for example processing primitives of the 3D model to determine image pixel values using conventional techniques such as lighting, transforms, texture mapping, rasterization and the like as is well known to those skilled in the art. The generated pixel data may be written to a frame buffer.

In step 1956, one or more rays may be traced from one or more points on the rasterized primitives using TTU hardware acceleration. The rays may be traced in accordance with the one or more ray-tracing capabilities disclosed in this application. Based on the results of the ray tracing, the pixel values stored in the buffer may be modified (Step 1958). Modifying the pixel values may in some applications for example improve the image quality by, for example, applying more realistic reflections and/or shadows. An image is displayed (Step 1960) using the modified pixel values stored in the buffer.

In one example, scan conversion and rasterization of geometric primitives may be implemented using the processing system described above, and ray tracing may be implemented by the SM's 132 using the TTU architecture described in relation to FIG. 7, to add further visualization features (e.g., specular reflection, shadows, etc.). FIG. 19 is just a non-limiting example—the SM's 132 could employ the described TTU by itself without texture processing or other conventional 3D graphics processing to produce images, or the SM's could employ texture processing and other conventional 3D graphics processing without the described TTU to produce images. The SM's can also implement any desired image generation or other functionality in software depending on the application to provide any desired programmable functionality that is not bound to the hardware acceleration features provided by texture mapping hardware, tree traversal hardware or other graphics pipeline hardware.

The TTU 138 in some embodiments is stateless, meaning that no architectural state is maintained in the TTU between queries. At the same time, it is often useful for software running on the SM 1840 to request continuation of a previous query, which implies that relevant state should be written to registers by the TTU 138 and then passed back to the TTU in registers (often in-place) to continue. This state may take the form of a traversal stack that tracks progress in the traversal of the BVH.

A small number of stack initializers may also be provided for beginning a new query of a given type, for example:

Traversal starting from a complet

Intersection of a ray with a range of triangles

Intersection of a ray with a range of triangles, followed by traversal starting from a complet Vertex fetch from a triangle buffer for a given triangle Optional support for instance transforms in front of the "traversal starting from a complet" and "intersection of a ray with a range of triangles".

Vertex fetch is a simple query that may be specified with request data that consists of a stack initializer and nothing else. Other query types may require the specification of a ray or beam, along with the stack or stack initializer and various ray flags describing details of the query. A ray is given by its three-coordinate origin, three-coordinate direction, and minimum and maximum values for the t-parameter along the ray. A beam is additionally given by a second origin and direction.

Various ray flags can be used to control various aspects of traversal behavior, back-face culling, and handling of the various child node types, subject to a pass/fail status of an optional rayOp test. RayOps add considerable flexibility to the capabilities of the TTU. In some example embodiments, the RayOps portion introduces two Ray Flag versions can be dynamically selected based on a specified operation on data conveyed with the ray and data stored in the complet. To explore such flags, it's first helpful to understand the different types of child nodes allowed within a BVH, as well as the various hit types that the TTU 138 can return to the SM. Example node types are:

A child complet (i.e., an internal node)

By default, the TTU 138 continues traversal by descending into child complets.

A triangle range, corresponding to a contiguous set of triangles within a triangle buffer (1) By default, triangle ranges encountered by a ray are handled natively by the TTU 138 by testing the triangles for intersection and shortening the ray accordingly. If traversal completes and a triangle was hit, default behavior is for the triangle ID to be returned to SM 1840, along with the t-value and barycentric coordinates of the intersection. This is the "Triangle" hit type.

(2) By default, intersected triangles with the alpha bit set are returned to SM 1840 even if traversal has not completed. The returned traversal stack contains the state required to continue traversal if software determines that the triangle was in fact transparent.

(3) Triangle intersection in some embodiments is not supported for beams, so encountered triangle ranges are by default returned to SM 1840 as a "TriRange" hit type, which includes a pointer to the first triangle block overlapping the range, parameters specifying the range, and the t-value of the intersection with the leaf bounding box.

An item range, consisting of an index (derived from a user-provided "item range base" stored in the complet) and a count of items.

By default, item ranges are returned to SM 1840 as an "ItemRange" hit type, consisting of for example an index, a count, and the t-value of the intersection with the leaf bounding box.

An instance node.

The TTU 138 in some embodiments can handle one level of instancing natively by transforming the ray into the coordinate system of the instance BVH. Additional levels of instancing (or every other level of instancing, depending on strategy) may be handled in software (or in other embodiments, the TTU 138 hardware can handle two, three or more levels of instancing). The "InstanceNode" hit type is provided for this purpose, consisting of a pointer to the instance node and the tvalue of the intersection with the leaf bounding box. In other implementations, the hardware can handle two, three or more levels of instancing.

In addition to the node-specific hit types, a generic "NodeRef" hit type is provided that consists of a pointer to the parent complet itself, as well as an ID indicating which child was intersected and the t-value of the intersection with the bounding box of that child.

An "Error" hit type may be provided for cases where the query or BVH was improperly formed or if traversal encountered issues during traversal.

A "None" hit type may be provided for the case where the ray or beam misses all geometry in the scene.

How the TTU handles each of the four possible node types is determined by a set of node-specific mode flags set as part of the query for a given ray. The "default" behavior mentioned above corresponds to the case where the mode flags are set to all zeroes.

Alternative values for the flags allow for culling all nodes of a given type, returning nodes of a given type to SM as a NodeRef hit type, or returning triangle ranges or instance nodes to SM using their corresponding hit types, rather than processing them natively within the TTU 138.

Additional mode flags may be provided for control handling of alpha triangles.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server or in a data center and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Furthermore, images generated applying one or more of the techniques disclosed herein may be used to train, test, or certify deep neural networks (DNNs) used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

All patents & publications cited above are incorporated by reference as if expressly set forth.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A ray tracing device comprising circuitry configured to perform operations comprising:
   receive information about a ray;
   receive a primitive range including a first primitive and a second primitive;
   determine whether the first primitive and the second primitive share at least one vertex;
   when the first and second primitives are determined to share at least one vertex, transforming vertices of the first primitive and one or more non-shared vertices of the second primitive in parallel into 2D ray-coordinate space;
   when the first and second primitives are determined to not share at least one vertex, transforming vertices of the first primitive and the vertices of the second primitive in series into 2D ray-coordinate space; and
   determine whether the first primitive and the second primitive are intersected by the ray based on the transformed vertices,
   wherein the first and second primitives are triangles sharing an edge defined by two vertices in each triangle, and transforming the vertices includes transforming three vertices of the first primitive and a single nonshared vertex of the second primitive;
   wherein the circuitry is further configured to:
   determine edge function values of post-transform triangle edges defined by transformed triangle vertices of the first primitive;
   if all edge function values of the first primitive are nonzero and have a same sign, identify the first primitive as being intersected;
   determine edge function values of post-transform triangle edges defined by transformed triangle vertices of the second primitive, without determining every edge function for the second primitive; and
   if all edge function values of the second primitive are nonzero and have a same sign, identify the second primitive as being intersected, wherein the edge function values of the first primitive and the edge function values of the second primitive are determined in parallel when the first and second primitives are determined to share at least one vertex.

2. The ray tracing device of claim 1, wherein the first and second primitives are included in a same compressed cacheline block.

3. The ray tracing device of claim 1, wherein the ray tracing device is configured to receive a plurality of compressed cacheline blocks identifying a primitive range, and the first and second primitives in the primitive range sharing an edge are identified in the plurality of cacheline blocks.

4. The ray tracing device of claim 1, wherein the circuitry comprises: a first primitive processing circuit configured to transform each vertex of the first primitive and a second primitive processing circuit configured to transform each of the one or more non-shared vertices of the second primitive when the first and second primitives are determined to share two vertices, and the first primitive processing circuit is configured to transform each vertex of the first primitive and each vertex of the second primitive when the first and second primitives are determined to not share at least one vertex.

5. A device comprising:
   memory configured to store at least a portion of an acceleration data structure defining plural bounding volumes, each bounding a plurality of primitives; and
   hardware circuitry configured to:
   receive, from a processor, a query including information about a ray and information about a bounding volume hierarchy;
   traverse the bounding volume hierarchy to determine a bounding volume within said bounding volume hierarchy the ray intersects, the intersected bounding volume identifying a range of primitives;
   determine whether a pair of primitives in the range of primitives share an edge;
   when the pair of primitives is determined to share the edge, determine coordinates of the ray relative to vertices of a first primitive of the pair of primitives and coordinates of the ray relative to vertices of a second primitive of the pair of primitives in parallel; and
   determine whether the first primitive and the second primitive are intersected by the ray based on the ray intersection coordinates for the first primitive and the ray intersection coordinates for the second primitive, wherein the hardware circuitry includes a first coordinate circuit configured to determine ray intersection coordinates for the first primitive and a second coordinate circuit configured to determine ray intersection coordinates for the second primitive, the first coordinate circuit includes first transform circuitry configured to transform each vertex of the first primitive and the second coordinate circuit includes second transform circuitry configured to transform only a portion of the vertices of the second primitive, the first coordinate circuit includes first edge circuitry configured to determine edge function values of post-transform first primitive edges based on first primitive vertices transformed by the first transform circuit and second edge circuitry configured to determine edge function values of post-transform second primitive edges based on second primitive vertices transformed by the second transform circuit and the first transform circuit.

6. The device of claim 5, wherein when the first primitive and/or the second primitive are determined to be intersected by the ray, the device provides a single hit result per cycle.

7. The device of claim 5, wherein the first transform circuitry is configured to transform each vertex of the first primitive into 2D projected ray-coordinate space, and the second transform circuitry is configured to transform each non-shared vertex of the second primitive into 2D projected ray-coordinate space.

8. The device of claim 5, wherein the first transform circuitry and the second transform circuitry are configured to operate in parallel.

9. The device of claim 5, wherein the determination of whether the pair of primitives in the range of primitives share an edge is performed only on primitives in a single compressed cacheline block.

10. The device of claim 5, wherein the first edge circuitry and the second edge circuitry are configured to operate in parallel.

11. The device of claim 5, wherein the coordinates of the ray relative to vertices of the first primitive are determined based on a transformed ray and the edge function values of post-transform first primitive edges, and the coordinates of the ray relative to vertices of the second primitive are determined based on the transformed ray and the edge function values of post-transform second primitive edges.

12. A device comprising:
memory configured to More at least a portion of an acceleration data structure defining plural bounding volumes, each bounding a plurality of primitives; and
hardware circuitry configured to:
receive, from a processor, a query including information about a ray and information about a bounding volume hierarchy;
traverse the bounding volume hierarchy to determine a bounding volume within said bounding volume hierarchy the ray intersects the intersected bounding volume identifying a range of primitives;
determine whether a pair of primitives in the range of primitives share an edge;
when the pair of primitives is determined to share the edge, determine coordinates of the ray relative to vertices of a first primitive of the pair of primitives and coordinates of the ray relative to vertices of a second primitive of the pair of primitives in parallel; and determine whether the first primitive and the second primitive are intersected by the ray based on the ray intersection coordinates for the first primitive and the ray intersection coordinates for the second primitive, wherein when the first primitive and/or the second primitive are determined to be intersected by the ray, the device provides a single hit result per cycle.

13. A device comprising:
memory configured to store at least a portion of an acceleration data structure defining plural bounding volumes, each bounding a plurality of primitives; and
hardware circuitry configured to:
receive, from a processor, a query including information about a ray and information about a bounding volume hierarchy;
traverse the bounding volume hierarchy to determine a bounding volume within said bounding volume hierarchy the ray intersects, the intersected bounding volume identifying a range of primitives;
determine whether a pair of primitives in the range of primitives share an edge;
when the pair of primitives is determined to share the edge, determine coordinates of the ray relative to vertices of a first primitive of the pair of primitives and coordinates of the ray relative to vertices of a second primitive of the pair of primitives in parallel; and
determine whether the first primitive and the second primitive are intersected by the ray based on the ray intersection coordinates for the first primitive and the ray intersection coordinates for the second primitive,
wherein the determination of whether the pair of primitives in the range of primitives share an edge is performed only on primitives in a single compressed cacheline block.

14. A device comprising:
memory configured to store at least a portion of an acceleration data structure defining plural bounding volumes, each bounding a plurality of primitives; and
hardware circuitry configured to:
receive, from a processor, a query including information about a ray and information about a bounding volume hierarchy:
traverse the bounding volume hierarchy to determine a bounding volume within said bounding volume hierarchy the ray intersects the intersected bounding volume identifying a range of primitives;
determine whether a pair of primitives in the range of primitives share an edge;
when the pair of primitives is determined to share the edge, determine coordinates of the ray relative to vertices of a first primitive of the pair of primitives and coordinates of the ray relative to vertices of a second primitive of the pair of primitives in parallel; and
determine whether the first primitive and the second primitive are intersected by the ray based on the ray intersection coordinates for the first primitive and the ray intersection coordinates for the second primitive,
wherein the determination of whether the pair of primitives in the range of primitives share an edge is performed on a plurality of compressed cacheline blocks identifying the primitive range.

15. A device comprising:
memory configured to store at least a portion of an acceleration data structure defining plural bounding volumes, each bounding a plurality of primitives; and hardware circuitry configured to:
receive, from a processor, a query including information about a ray and information about a bounding volume hierarchy;
traverse the bounding volume hierarchy to determine a bounding volume within said bounding volume hierarchy the ray intersects, the intersected bounding volume identifying a range of primitives;
determine whether r a pair of primitives s in the range of primitives share an edge;
when the pair of primitives is determined to share the edge, determine coordinates of the ray relative to vertices of a first primitive of the pair of primitives and coordinates of the ray relative to vertices of a second primitive of the pair of primitives in parallel; and
determine whether the first primitive and the second primitive are intersected by the ray based on the ray intersection coordinates for the first, primitive and the ray intersection coordinates for the second primitive,
wherein the device is configured to receive a plurality of compressed cacheline blocks identifying the primitive range, and the pair of primitives in the range of primitives sharing an edge are identified in the cacheline blocks.

16. The device of claim 15, wherein the memory and the hardware circuitry are a part of a server or a data center employed in generating an image, and the image is streamed to a user device.

17. The device of claim 15, wherein the hardware circuitry is employed in generating an image, and the image is used for training, testing, or certifying a neural network employed in a machine, robot, or autonomous vehicle.

18. A ray tracing method implemented by a hardware-based traversal coprocessor coupled to a multiprocessor, the method comprising:
storing, in memory, at least a portion of an accelerated data structure including a plurality of hierarchical nodes, at least one node identifying at least a first primitive and a second primitive of a virtual scene;
receive information about a ray;
determining whether the first primitive and the second primitive share at least one vertex;
when the first and second primitives are determined to share at least one vertex, transforming vertices of the first primitive and one or more non-shared vertices of the second primitive in parallel into 2D ray-coordinate space;
when the first and second primitives are determined to not share at least one vertex, transforming vertices of the first primitive and the vertices of the second primitive in series into 2D ray-coordinate space; and
determining whether the first primitive and the second primitive are intersected by the ray based on the transformed vertices,
wherein the primitives are triangles and the method further comprises:
determining edge function values of post-transform triangle edges defined by transformed triangle vertices of the first primitive;
determining only a portion of edge function values of post-transform triangle edges defined by transformed triangle vertices of the second primitive;
if all edge function values of the first primitive are nonzero and have a same sign, identifying the first primitive as being intersected; and
if all determined edge function values of the second primitive and the determined edge function value of the first primitive including the shared vertex are nonzero and have a same sign, identifying the second primitive as being intersected.

19. The method of claim 18, wherein the first and second primitives share an edge defined by two vertices in each triangle, and transforming the vertices includes transforming three vertices of the first primitive and a single non-shared vertex of the second primitive.

20. The method of claim 18, wherein the first and second primitives are included in a same compressed cacheline block.

21. The method of claim 18, wherein the storing, receiving, determining whether the first primitive and the second primitive share at least one vertex, and determining whether the first primitive and the second primitive are intersected by the ray are performed on a server or in a data center to generate an image, and the image is streamed to a user device.

22. The method of claim 18, wherein the storing, receiving, determining whether the first primitive and the second primitive share at least one vertex, and determining whether the first primitive and the second primitive are intersected by the ray are performed to generate an image used for training, testing, or certifying a neural network employed in a machine, robot, or autonomous vehicle.

23. Ray tracing hardware for testing whether a ray intersects first and second primitives, the first primitive comprising first, second and third vertices, the second primitive comprising the second and third vertices and a fourth vertex, the ray tracing hardware comprising:
a first primitive processing circuit comprising
a first calculator that performs a first calculation for the first vertex;
a second calculator that performs a second calculation for the second vertex;
a third calculator that performs a third calculation for the third vertex, and
a first intersection test circuit connected to the first, second and third calculators that tests based on the first, second and third calculations whether a ray intersects the first primitive; and
a second primitive processing circuit comprising
a fourth calculator that performs a fourth calculation for the fourth vertex, and
a second intersection test circuit connected to the second, third and fourth calculators that tests based on the second, third and fourth calculations whether the ray intersects the second primitive.

24. The ray tracing hardware of claim 23 wherein the first, second, third and fourth calculators operate concurrently and the first and second intersection test circuits operate concurrently.

25. The ray tracing hardware of claim 23 wherein the first, second, third and fourth calculations support vertex projections and/or edge function value determinations the first and second intersection test circuits perform.

* * * * *